US010039099B2

(12) United States Patent
Sato et al.

(10) Patent No.: US 10,039,099 B2
(45) Date of Patent: Jul. 31, 2018

(54) WIRELESS COMMUNICATION SYSTEM AND WIRELESS COMMUNICATION METHOD

(71) Applicant: NEC Corporation, Minato-ku, Tokyo (JP)

(72) Inventors: Toshifumi Sato, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/319,125

(22) PCT Filed: Jun. 24, 2015

(86) PCT No.: PCT/JP2015/003183
§ 371 (c)(1),
(2) Date: Dec. 15, 2016

(87) PCT Pub. No.: WO2016/002166
PCT Pub. Date: Jan. 7, 2016

(65) Prior Publication Data
US 2017/0156142 A1 Jun. 1, 2017

(30) Foreign Application Priority Data

Jun. 30, 2014 (JP) .................................. 2014-134111

(51) Int. Cl.
*H04W 72/00* (2009.01)
*H04W 72/04* (2009.01)
(Continued)

(52) U.S. Cl.
CPC ....... *H04W 72/0446* (2013.01); *H04L 1/0009* (2013.01); *H04L 27/2601* (2013.01);
(Continued)

(58) Field of Classification Search
CPC ............. H04L 1/0009; H04L 27/2601; H04W 72/0446; H04W 92/12; H04W 88/02; H04W 88/08
(Continued)

(56) References Cited

U.S. PATENT DOCUMENTS 6,353,638 B1 * 3/2002 Hottinen ................ H04B 7/022
375/260
2007/0037581 A1 * 2/2007 Morita .................. H04W 28/02
455/453
(Continued)

FOREIGN PATENT DOCUMENTS

EP 2 525 623 A2 11/2012
JP 2004-312150 A 11/2004
(Continued)

OTHER PUBLICATIONS

Development of Wireless Base Station for LTE System Usable with W-CDMA System, Technology Reports, NTT DOCOMO Technical Journal vol. 19, No. 1, pp. 20-25, Apr. 2011. URL: https://www.nttdocomo.co.jp/corporate/technology/rd/technical_journal/bn/vol19_1/020.html.
(Continued)

*Primary Examiner* — William Nealon

(57) ABSTRACT

Provided is a wireless communication system that efficiently carries out communications between a wireless control device and a wireless device. A wireless control device (20) has a wireless resource allocation unit (22) and a wireless resource instruction unit (24). The wireless resource allocation unit (22) allocates wireless resources that are used by a wireless device (30) when wirelessly communicating with a wireless terminal (2). The wireless resource instruction unit (24) sends, to the wireless device (30), instructions for causing the allocated wireless resources to be used. The wireless device (30) has a wireless signal processing unit
(Continued)

(32) and a wireless transmission unit (34). On the basis of the instructions from the wireless control device (20), the wireless signal processing unit (32) performs processing, for performing wireless communications using the allocated wireless resources, on data to be sent to the wireless terminal (2). The wireless transmission unit (34) converts signals processed by the wireless signal processing unit (32) to wireless signals, and transmits the wireless signals to the wireless terminal (2).

7 Claims, 20 Drawing Sheets

(51) Int. Cl.
*H04L 1/00* (2006.01)
*H04L 27/26* (2006.01)
*H04W 92/12* (2009.01)
*H04W 88/08* (2009.01)
*H04W 88/02* (2009.01)

(52) U.S. Cl.
CPC ............ *H04W 88/02* (2013.01); *H04W 88/08* (2013.01); *H04W 92/12* (2013.01)

(58) Field of Classification Search
USPC ........................................................ 455/450
See application file for complete search history.

(56) References Cited

U.S. PATENT DOCUMENTS

| | | | | |
|---|---|---|---|---|
| 2008/0039143 | A1* | 2/2008 | Shoji ..................... | H04W 36/18 455/561 |
| 2010/0298006 | A1* | 11/2010 | Ko ......................... | H04B 7/022 455/452.2 |
| 2012/0009957 | A1* | 1/2012 | Murasawa .............. | H04W 8/26 455/507 |
| 2013/0100907 | A1 | 4/2013 | Liu | |
| 2013/0331110 | A1* | 12/2013 | Jia ......................... | H04W 28/06 455/450 |
| 2015/0195019 | A1* | 7/2015 | Nagata .................. | H04B 7/0456 375/267 |

FOREIGN PATENT DOCUMENTS

| | | |
|---|---|---|
| JP | 2012-019468 A | 1/2012 |
| JP | 2013-243454 A | 12/2013 |
| JP | 2014-030135 A | 2/2014 |
| JP | 2014-112976 A | 6/2014 |

OTHER PUBLICATIONS

CPRI Specification V6.0 (Aug. 30, 2013), Common Public Radio Interface (CPRI); Interface Specification, Aug. 30, 2013, Ericsson AB, Huawei Technologies Co. Ltd, NEC Corporation, Alcatel Lucent, and Nokia Siemens Networks GmbH & Co. KG, pp. 1-128. URL: http://www.cpri.info/downloads/CPRI_v_6_0_2013-08-30.pdf.
Suggestions on Potential Solutions to C-RAN by NGMN Alliance, Version 4.0, NGMN Ltd (Next Generation Mobile Networks), Jan. 3, 2013, pp. 1-41 URL: http://www.ngmn.org/uploads/media/NGMN_CRAN_Suggestions_on_Potential_Solutions_to_CRAN.pdf.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12), 3GPP TS 36.300 V12.1.0 (Mar. 2014), pp. 1-209. URL: http://www.3gpp.org/ftp/Specs/archive/36_series/36.300/36300-c10.zip.
International Search Report for PCT Application No. PCT/JP2015/003183, dated Aug. 25, 2015.
English translation of Written opinion for PCT Application No. PCT/JP2015/003183.
Andreas Maeder et al., "Towards a Flexible Functional Split for Cloud-RAN Networks", 2014 European Conference on Networks and Communications, IEEE, Jun. 23, 2014, pp. 1-5, XP032629363.
Stefan Geirhofer et al., "Capacity Enhancement Through Opportunistic Activation of Relays in Cloud RAN Deployments", 2013 IEEE Globecom Workshops, IEEE, Dec. 9, 2013, pp. 1-6, XP032599878.
Communication dated Feb. 5, 2018, from European Patent Office in counterpart application No. 15815230.6.

* cited by examiner

WIRELESS COMMUNICATION SYSTEM AND WIRELESS COMMUNICATION METHOD

This application is a National Stage Entry of PCT/JP2015/003183 filed on Jun. 24, 2015, which claims priority from Japanese Patent Application 2014-134111 filed on Jun. 30, 2014, the contents of all of which are incorporated herein by reference, in their entirety.

TECHNICAL FIELD

The present invention relates to a wireless communication system and a wireless communication method and, more particularly, to a wireless communication system obtained by separating the functions of a wireless base station into a wireless control device and a wireless device, and a wireless communication method.

BACKGROUND ART

In a wireless communication system which performs communication using wireless terminals such as mobile phones and smartphones, remote base station equipment has been developed. Regarding this technique, NPL 1 discloses radio base station equipment for a remote LTE (Long Term Evolution) system. In NPL 1, radio BDE (Base Station Digital Processing Equipment) located on the side of the center (for example, a core network) and a plurality of pieces of RRE (Remote Radio Equipment) located near antennas are connected to each other via optical fibers using the CPRI (Common Public Radio Interface) scheme.

CPRI refers herein to an open specification of an interface between a wireless control unit (REC: Radio Equipment Control) and a wireless unit (RE: Radio Equipment) in a radio base station and is described in detail in NPL 2. NPL 3 discloses a C-RAN (Radio Access Network). The C-RAN is formed by connecting a DU (Digital Unit) cloud located on the side of the center (for example, a core network) to an RU (Radio Unit) distributed for each antenna site via a wideband, low-latency transport network. NPL 4 discloses the specifications of an E-UTRAN (Evolved Universal Terrestrial Radio Access Network) used in LTE.

In NPL 1, the pieces of RRE (Remote Radio Equipment) simply execute optical/electrical conversion and RF (Radio Frequency) functions and the BDE executes other digital signal processing functions (error correction coding, radio framing, data modulation, frequency/time conversion, and MIMO (Multiple Input Multiple Output) processing). NPL 2 also discloses a configuration obtained by similar function sharing.

PTL 1 discloses a digital fiber wireless transmission system which assumes a network architecture connecting a slave station to a radio base station (master station) over a cable extending from the master station, and includes a master device connected to a mobile communication network, one or more slave station devices capable of radio communication with a mobile communication terminal, and a transmission line connected between the master device and each slave device and capable of bidirectional digital transmission. Note that in PTL 1, a signal processing circuit in the master device processes main signals (included in transmission frames) communicated between the signal processing circuit and the slave device connected to a transmission control circuit, directly as digital signals by signal processing such as signal demodulation, encoding/decoding, error detection/correction, and channel termination/multiple separation according to the radio scheme and protocol used.

CITATION LIST

Patent Literature

PTL 1: Japanese Unexamined Patent Application Publication No. 2004-312150

Non-Patent Literature

NPL 1: "Development of Wireless Base Station for LTE System Usable with W-CDMA System," NTT DOCOMO Technical Journal Vol. 19, No. 1, URL: https://www.nttdocomo.co.jp/corporate/technology/rd/technical_journal/bn/vol19_1/020.html
NPL 2: "CPRI Specification V6.0 (2013-08-30)," Common Public Radio Interface (CPRI)
NPL 3: "SUGGESTIONS ON POTENTIAL SOLUTIONS TO C-RAN BY NGMN ALLIANCE," NGMN Ltd (Next Generation Mobile Networks), URL: http://www.ngmn.org/uploads/media/NGMN_CRAN_Suggestions_on_Potential_Solutions_to_CRAN.pdf
NPL 4: "3GPP TS 36.300 V12.1.0 (2014-03)," 3GPP (3rd Generation Partnership Project)

SUMMARY OF INVENTION

Technical Problem

In the above-mentioned patent literature and non-patent literatures, the device (for example, the RRE, the RE, and the slave device) on the antenna side simply performs RF processing and the device (for example, the BDE, the REC, and the master device) on the center side performs other types of digital signal processing. This increases the rate of data transmitted between the device on the center side and the device on the antenna side. Therefore, according to the techniques described in the above-mentioned patent literature and non-patent literatures, communication between the device (wireless control device) on the center side and the device (wireless device) on the antenna side may not be conducted efficiently.

The present invention is made to solve the above-described problem and object of the present invention is to provide a wireless communication system and a wireless communication method for efficiently performing communication between a wireless control device and a wireless device.

Solution to Problem

A wireless communication system according to the present invention includes a wireless control device, and at least one wireless device which is connected to the wireless control device via a transmission line and wirelessly communicates with a wireless terminal, the wireless control device including wireless resource allocation means for allocating a wireless resource used by the wireless device in wireles sly communicating with the wireless terminal, and wireless resource instruction means for sending an instruction for allowing use of the allocated wireless resource to the wireless device, and the wireless device including wireless signal processing means for executing processing to perform wireless communication using the allocated wireless resource, on data to be sent to the wireless terminal, on the basis of the instruction from the wireless control device, and wireless transmission means for converting a signal processed by the wireless signal processing means into a wireless signal and transmitting the wireless signal to the wireless terminal.

Another wireless communication system according to the present invention includes a wireless control device, at least one wireless device which wirelessly communicates with a wireless terminal, and a relay device which is interposed between the wireless control device and the wireless device, connected to the wireless control device via a first transmission line, and connected to the wireless device via a second transmission line, the wireless control device including wireless resource allocation means for allocating a wireless resource used by the wireless device in wirelessly communicating with the wireless terminal, and wireless resource instruction means for sending an instruction for allowing use of the allocated wireless resource to the relay device, wherein the relay device executes processing to perform wireless communication using the allocated wireless resource, on data to be sent to the wireless terminal, on the basis of the instruction from the wireless control device, and the wireless device converts a signal processed by the wireless signal processing means into a wireless signal and transmits the wireless signal to the wireless terminal.

A wireless communication method according to the present invention includes, in a wireless control device connected via a transmission line to at least one wireless device which wirelessly communicates with a wireless terminal, allocating a wireless resource used by the wireless device in wirelessly communicating with the wireless terminal, sending an instruction for allowing use of the allocated wireless resource to the wireless device, in the wireless device, executing processing to perform wireless communication using the allocated wireless resource, on data to be sent to the wireless terminal, on the basis of the instruction from the wireless control device, and converting a signal processed by the wireless signal processing means into a wireless signal and transmitting the wireless signal to the wireless terminal.

Advantageous Effects of Invention

The present invention can provide a wireless communication system and a wireless communication method for efficiently performing communication between a wireless control device and a wireless device.

DESCRIPTION OF EMBODIMENTS (Overview of Exemplary Embodiment According to Present Invention)

Figure 1:
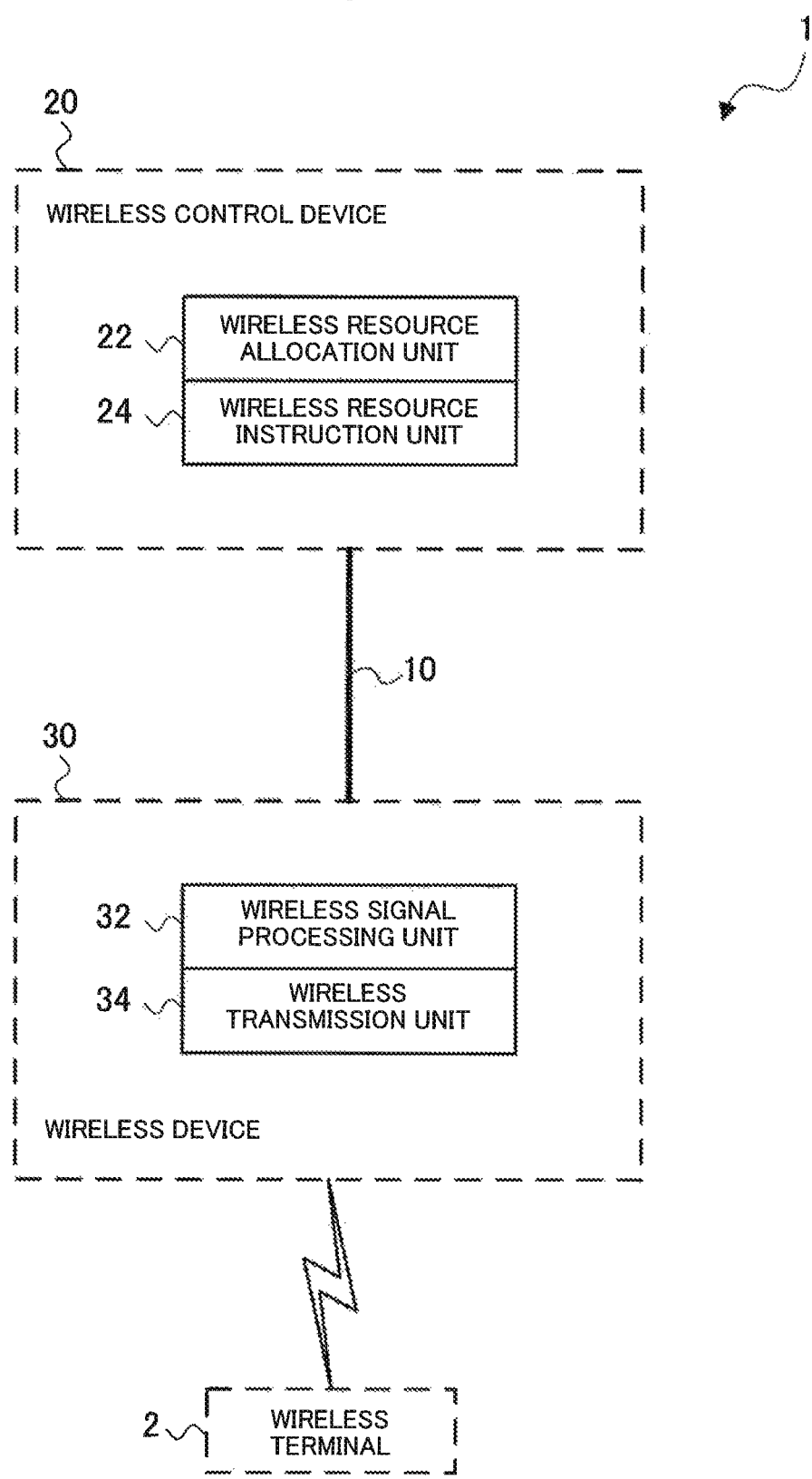
FIG. 1 is a diagram illustrating an overview of a wireless communication system according to an exemplary embodiment of the present invention.

Before a description of exemplary embodiments of the present invention, an overview of an exemplary embodiment according to the present invention will be described below. FIG. 1 is a diagram illustrating an overview of a wireless communication system 1 according to an exemplary embodiment of the present invention. The wireless communication system 1 includes a wireless control device 20 and at least one wireless device 30, as illustrated in FIG. 1. The wireless device 30 is connected to the wireless control device 20 via a transmission line 10 and wirelessly communicates with at least one wireless terminal 2.

The wireless control device 20 includes a wireless resource allocation unit 22 (wireless resource allocation means) and a wireless resource instruction unit 24 (wireless resource instruction means). The wireless resource allocation unit 22 allocates a wireless resource used by the wireless device 30 in wirelessly communicating with the wireless terminal 2. The wireless resource instruction unit 24 sends an instruction for allowing use of the allocated wireless resource to the wireless device 30.

The wireless device 30 includes a wireless signal processing unit 32 (wireless signal processing means) and a wireless transmission unit 34 (wireless transmission means).

The wireless signal processing unit 32 executes processing to perform wireless communication using the allocated wireless resource, on data to be sent to the wireless terminal 2, on the basis of the instruction from the wireless control device 20. The wireless transmission unit 34 converts a signal processed by the wireless signal processing unit 32 into a wireless signal and transmits the wireless signal to the wireless terminal 2.

The wireless communication system 1 and the wireless communication method according to the exemplary embodiment of the present invention can reduce the volume of data (rate of data) transmitted through the transmission line 10 between the wireless control device 20 and the wireless device 30. This allows efficient communication between the wireless control device 20 and the wireless device 30. Even by the wireless control device 20 or the wireless device 30, efficient communication between the wireless control device 20 and the wireless device 30 becomes possible. A relay device may be interposed between the wireless control device 20 and the wireless device 30 and include a wireless signal processing unit 32 on behalf of the wireless device 30 to allow efficient communication between the wireless control device 20 and the wireless device 30 (relay device).

(First Exemplary Embodiment)

Exemplary embodiments will be described below with reference to the drawings. Although the use of LTE will be taken as an example of the radio scheme in each following exemplary embodiment, the present invention is not limited to this. These exemplary embodiments are also applicable to an arbitrary radio access scheme and an arbitrary combination of a plurality of radio access schemes (for example, a combination of CDMA (Code Division Multiple Access)/HSPA (High Speed Packet Access)/LTE/LTE-advanced).

Figure 2:
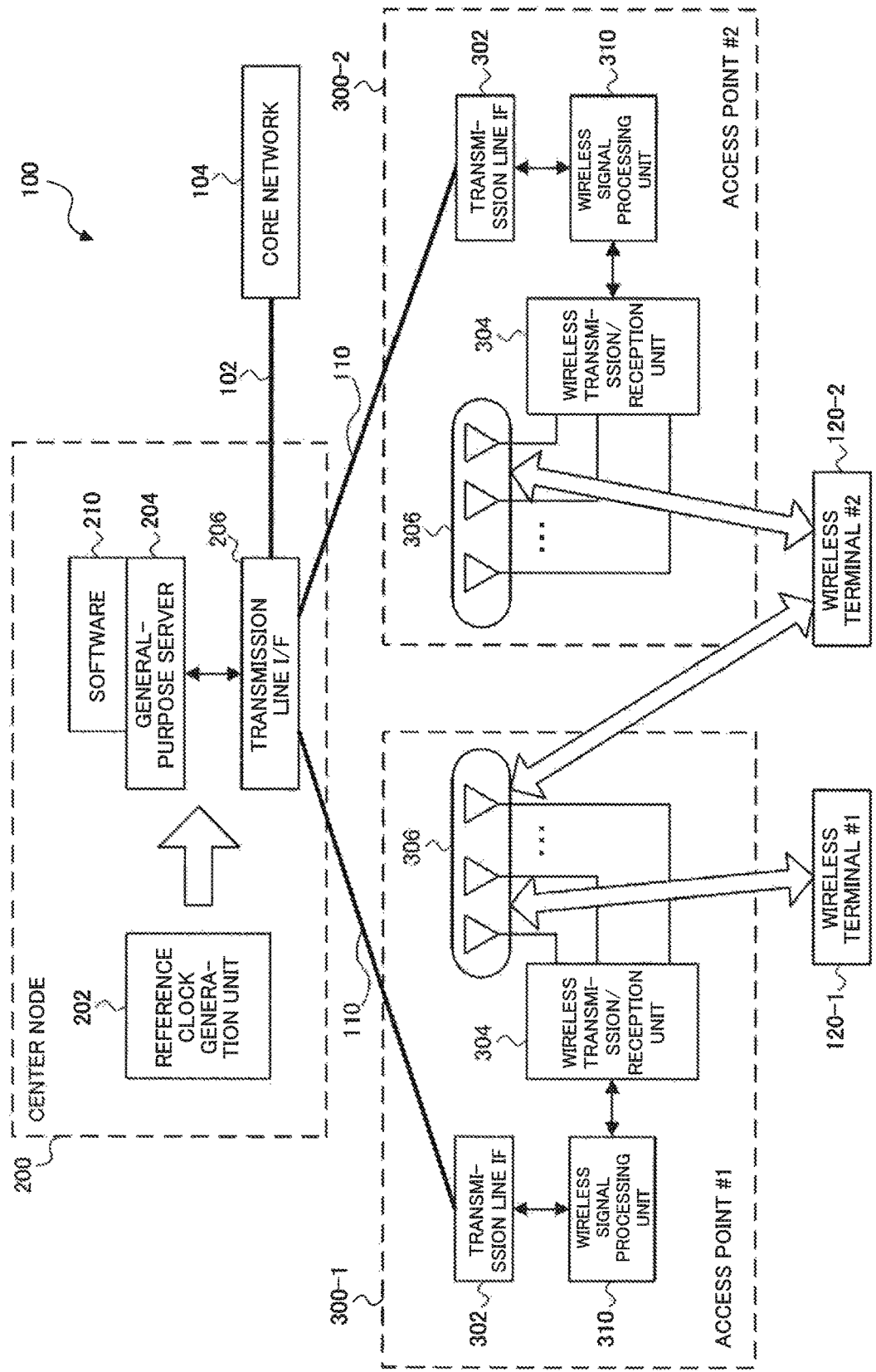
FIG. 2 is a diagram illustrating a wireless communication system according to a first exemplary embodiment.

FIG. 2 is a diagram illustrating a wireless communication system 100 according to a first exemplary embodiment. The wireless communication system 100 may serve as, for example, a RAN (Radio Access Network). The wireless communication system 100 includes a center node 200 and a plurality of access points 300-1 (access point #1) and 300-2 (access point #2). A plurality of wireless terminals 120-1 (wireless terminal #1) and 120-2 (wireless terminal #2) wirelessly communicate with the wireless communication system 100. In the following description of a plurality of components such as the access points 300-1 and 300-2 without distinction, they will be simply referred to as, for example, access points 300 hereinafter. The center node 200 corresponds to a wireless control device. The access point 300 corresponds to a wireless device.

Although FIG. 2 depicts two access points 300, the present invention is not limited to this. The number of access points 300 may be one or three or more. Similarly, although FIG. 2 depicts two wireless terminals 120, the present invention is not limited to this. The number of wireless terminals 120 may be one or three or more. The same applies to other exemplary embodiments.

The center node 200 is connected to a core network 104 via a backhaul 102. The center node 200 and the access point 300 are located at physically spaced positions and connected to each other via a transmission line 110. The wireless terminal 120 serves as a mobile communication terminal such as a mobile phone or a smartphone. The wireless terminal 120 transmits/receives wireless signals to/from the access point 300.

The transmission line 110 serves as a medium for transmitting information, such as an optical fiber, a metal cable, or radio. Although the transmission line 110 may be compliant with, for example, Ethernet®, the present invention is not limited to this. The transmission line 110 is used to transmit user data, and control channels/control signals and the like exchanged between the center node 200 and the access point 300, other than user data, as will be described later.

The center node 200 and the access point 300 are connected to each other via the transmission line 110 formed by one or more media. More specifically, the transmission line 110 may be formed by only an optical fiber. Whereas, the transmission line 110 may be formed by an optical fiber and radio or a metal cable. For example, the transmission line 110 may be formed by routing the center node 200 to the vicinity of the access point 300 by wiring an optical fiber, and routing the remaining several ten meters via radio or a metal cable, for simplified wiring.

Although the transmission line 110 connecting the center node 200 to the access point 300-1 and the transmission line 110 connecting the center node 200 to the access point 300-2 are separate from each other in FIG. 1, the present invention is not limited to such a configuration. When the access points 300-1 and 300-2 are adjacent to each other, they may partially share the transmission line 110. In this case, a distributor may be placed near the access points 300. Note that the distributor, for example, multiplexes and demultiplexes wavelength-multiplexed signals or multiplexes and demultiplexes time-multiplexed signals.

The center node 200 includes a reference clock generation unit 202, a general-purpose server 204, and a transmission line interface 206 (transmission line I/F (Interface)). The reference clock generation unit 202 generates a reference clock for synchronization processing in the wireless communication system 100. The reference clock will be described later.

The general-purpose server 204 includes one or more computers. The general-purpose server 204 executes software 210. More specifically, the general-purpose server 204 loads software 210 stored on a recording medium (not illustrated) into a memory (not illustrated) and executes the software 210 under the control of an arithmetic device (not illustrated) such as a CPU (Central Processing Unit). In other words, the software 210 runs on the general-purpose server 204. The software 210 will be described later. The transmission line interface 206 performs processing according to the standard (for example, Ethernet) of the transmission line 110 in exchanging data with the access point 300 via the transmission line 110.

The access point 300 includes a transmission line interface 302 (transmission line I/F (Interface)), a wireless signal processing unit 310, a wireless transmission/reception unit 304, and an antenna 306. The antenna 306 includes a plurality of antennas and may be, for example, an antenna array including a plurality of antenna elements. The transmission line interface 302 performs processing according to the standard (for example, Ethernet) of the transmission line 110 in exchanging data with the center node 200 via the transmission line 110.

The wireless signal processing unit 310 and the wireless transmission/reception unit 304 will be described later.

The wireless terminal 120 communicates with a radio access network (wireless communication system 100) via one or more access points 300. When downstream signals (signals from the access points 300 to the wireless terminal 120) are transmitted from a plurality of access points 300 to one wireless terminal 120, each of the plurality of access points 300 may use mutually different frequencies or the same frequencies. Further, in this case, each of the plurality of access points 300 may transmit mutually different pieces of data or the same data to one wireless terminal 120. The information indicating whether the frequencies are the same and the information indicating whether the data are the same do not correspond to each other. In other words, the same data may be transmitted using different frequencies or using the same frequencies.

Similarly, when one access point 300 simultaneously transmits downstream signals to a plurality of wireless terminals 120, the access point 300 may transmit downstream signals to the plurality of wireless terminals 120 using mutually different frequencies or using the same frequencies. A spatial multiplexing technique such as MU-MIMO (Multi-User Multiple-Input Multiple-Output) or beam-forming may be employed as a technique for simultaneously transmitting different pieces of data to the plurality of wireless terminals 120 using the same frequencies.

Specific operations of the center node 200 and the access point 300 will be described below. The center node 200 and the access point 300 share and process the functions of a radio base station with each other, as will be described hereinafter. Although such operations will be described below mainly assuming the downstream direction (from the center node 200 to the access point 300, and from the access point 300 to the wireless terminal 120), corresponding operations are obviously also performed in the upstream direction (from the wireless terminal 120 to the access point 300, and from the access point 300 to the center node 200).

Figure 3:
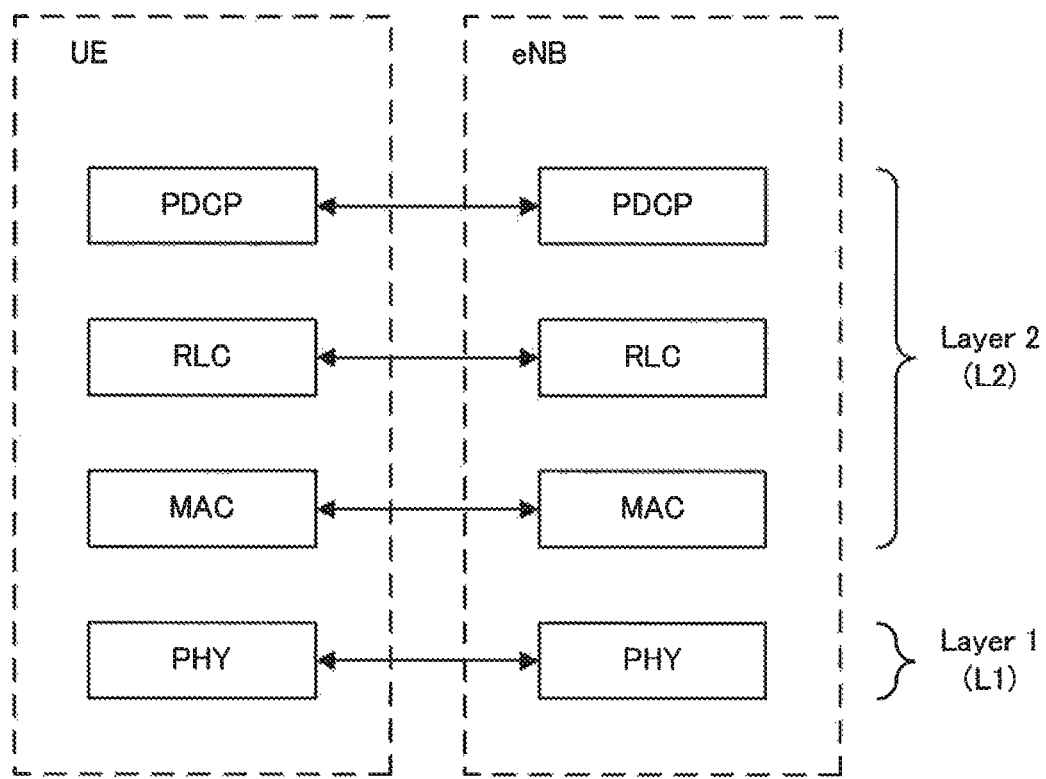
FIG. 3 is a diagram illustrating an exemplary user-plane protocol stack in LTE.

FIG. 3 is a diagram illustrating an exemplary user-plane protocol stack in LTE. FIG. 3 is presented in NPL 4. The user-plane protocol stack is divided into a layer 2 protocol (L2) and a layer 1 (PHY: physical layer) protocol (L1), as illustrated in FIG. 3. Layer 2 includes three sublayers: PDCP (Packet Data Convergence Protocol), RLC (Radio Link Control), and MAC (Media Access Control). Layers 2 and 1 are connected to each other via a transport channel to transmit MAC_PDU (Protocol Data Unit) serving as user data.

Layer 2 protocol processing is a function which can be efficiently implemented by software (general-purpose server). In the present exemplary embodiment, therefore, the layer 2 protocol processing is implemented by the software 210 running on the general-purpose server 204 of the center node 200. In other words, the general-purpose server 204 (software 210) of the center node 200 mainly performs layer 2 processing of protocol processing on user data directed to each wireless terminal 120.

Layer 1 protocol processing is a function hard to efficiently implement by software (general-purpose server). In the present exemplary embodiment, therefore, the layer 1 protocol processing is implemented by the wireless signal processing unit 310 of the access point 300. In other words, the wireless signal processing unit 310 of the access point 300 mainly performs layer 1 processing of the protocol processing on user data directed to each wireless terminal 120.

Figure 4:
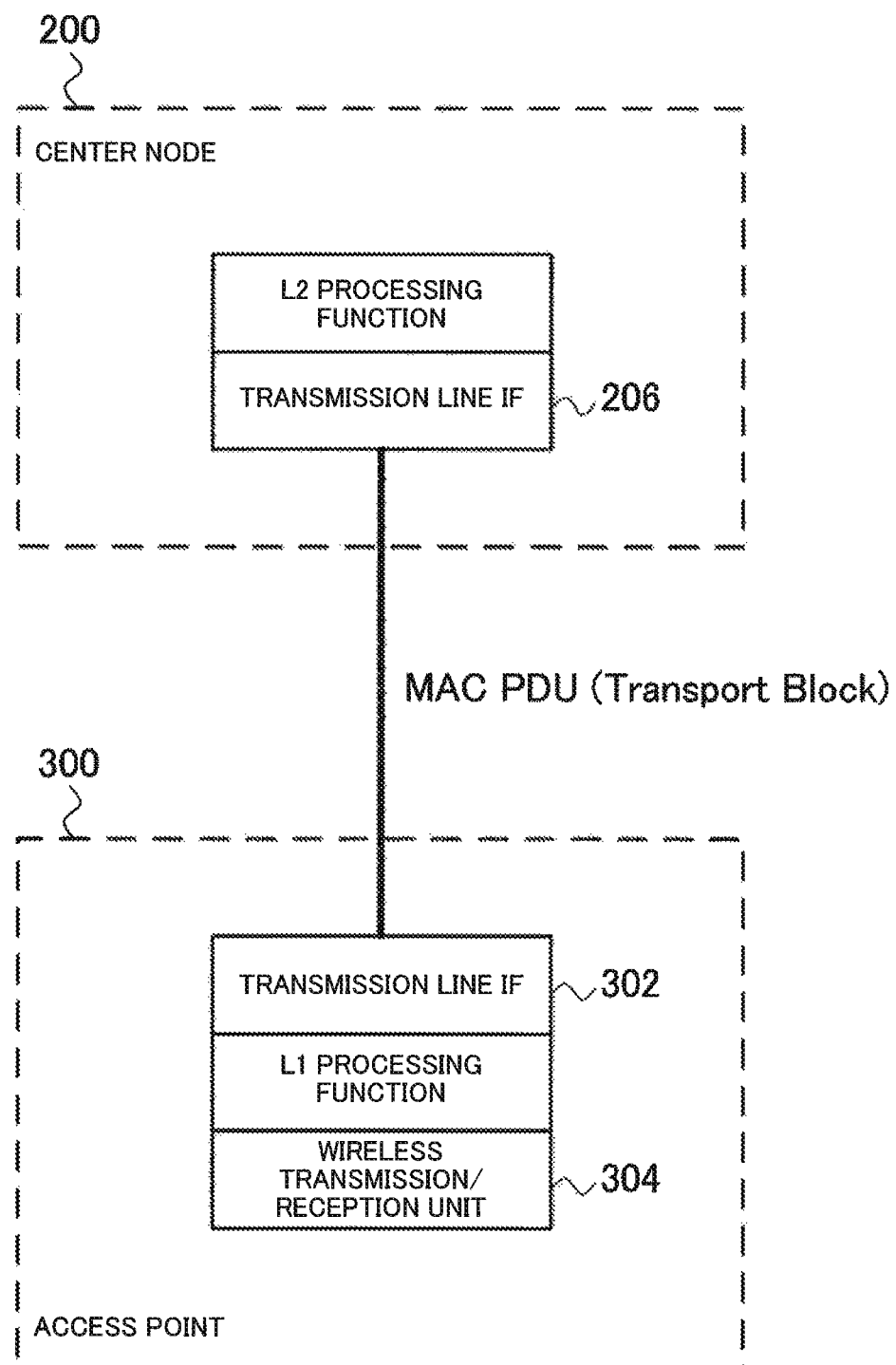
FIG. 4 is a diagram illustrating how protocol processing functions are shared between a center node and an access point according to the first exemplary embodiment.

FIG. 4 is a diagram illustrating how protocol processing functions are shared between the center node 200 and the access point 300 according to the first exemplary embodiment. As described above, an L2 processing function is located at the center node 200 and implemented by the software 210 running on the general-purpose server 204. An L1 processing function is located at the access point 300 and implemented by the wireless signal processing unit 310. MAC_PDU (Transport Block) serving as user data is transmitted on the transmission line 110 connecting the center node 200 to the access point 300.

Figure 5:
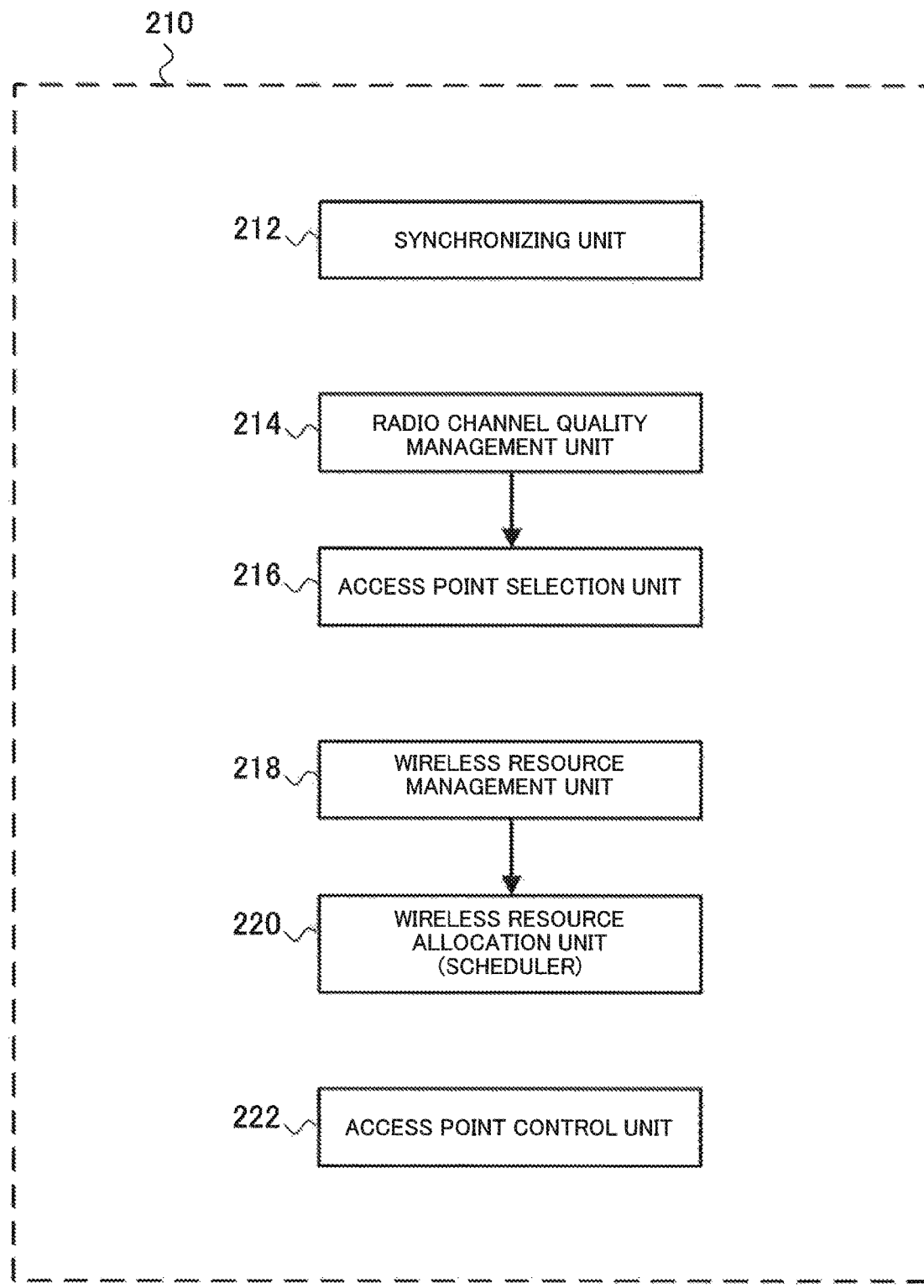
FIG. 5 is a block diagram illustrating the configuration of software running at the center node according to the first exemplary embodiment.

FIG. 5 is a block diagram illustrating the configuration of the software 210 running at the center node 200 according to the first exemplary embodiment. The software 210 includes a synchronizing unit 212, a radio channel quality management unit 214, an access point selection unit 216, a wireless resource management unit 218, a wireless resource allocation unit 220, and an access point control unit 222. The above-mentioned components of the software 210 are merely an example and are not limited to this.

The synchronizing unit 212 performs synchronization processing using a reference clock generated by the reference clock generation unit 202. In a radio access network, the radio frequencies need to be accurately matched in each device. This is called frequency synchronization. When TDD (Time Division Duplex) is used as a radio scheme, the switching timings of transmission/reception need to be accurately matched among a plurality of access points 300. This is called timing synchronization. This timing synchronization is needed in processing not only at the access point 300 but also at the center node 200. The synchronizing unit 212 performs processing for such frequency synchronization and timing synchronization. The synchronizing unit 212 performs processing to transmit a signal (sync signal) for synchronizing the access point 300 to the access point 300 via the transmission line interface 206 and the transmission line 110, using the reference clock.

The synchronizing unit 212 performs processing to distribute the reference clock to each access point 300 via the transmission line 110, using protocols such as Synchronous Ethernet® and PTP (Precision Time Protocol) defined in IEEE1588. Synchronous Ethernet is used for frequency synchronization. PTP is used for frequency synchronization and timing synchronization. The center node 200 may synchronize the frequencies and timings of each node in the radio access network, using GNSS (Global Navigation Satellite System) such as GPS (Global Positioning System) or in combination with the above-mentioned method.

When FDD (Frequency Division Duplex) is used as a radio scheme, timing synchronization among the plurality of access points 300 is optional. However, the timings among the plurality of access points 300 are preferably synchronized when the plurality of access points 300 perform cooperative operations, as will be described later. The cooperative operations between the access points may be performed when, for example, one wireless terminal 120 and the plurality of access points 300 simultaneously perform communication, or the use of the same wireless resources is avoided to reduce interference between adjacent access points 300.

The radio channel quality management unit 214 manages the radio channel quality (for example, the propagation loss, the received signal strength, and the magnitude of noise/interference) between each wireless terminal 120 and each access point 300. More specifically, the radio channel quality management unit 214 receives information (radio channel quality information) concerning the radio channel quality between each access point 300 and each wireless terminal 120, from this access point 300 via the transmission line 110 and the transmission line interface 206.

Each access point 300 may generate radio channel quality information by receiving information such as a CQI (Channel Quality Indicator) from each wireless terminal 120.

The access point selection unit 216 (wireless device selection means) selects the access point 300 to be wirelessly communicated with the wireless terminal 120, for each wireless terminal 120. More specifically, the access point selection unit 216 selects at least one access point 300 corresponding to a best-quality radio channel, using the radio channel quality managed by the radio channel quality management unit 214. The access point selection unit 216 transmits, to this access point 300, a control signal for allowing the selected access point 300 to communicate with the wireless terminal 120 via the transmission line interface 206 and the transmission line 110. In this manner, the center node 200 communicates with the wireless terminal 120 via a best-quality access point 300. In the configuration of the present exemplary embodiment, the present invention is not necessarily limited to such a method.

The wireless resource management unit 218 manages wireless resources usable at each access point 300. Examples of the wireless resources include the time slot, the frequency, the transmitted power, and the space, but the present invention is not limited to these examples.

The wireless resource allocation unit 220 serves as, for example, a scheduler and performs processing (scheduling) to allocate wireless resources to the wireless terminals 120. More specifically, the wireless resource allocation unit 220 determines with which wireless terminal 120 the center node 200 communicates in using the wireless resources managed by the wireless resource management unit 218. The wireless resource allocation unit 220 then transmits a wireless resource instruction signal to the access point 300 via the transmission line interface 206 and the transmission line 110. The wireless resource instruction signal means herein an instruction signal indicating, to the access point 300, which wireless resources are used in transmission and reception to and from the wireless terminal 120 to be communicated, and represents an instruction for allowing the access point 300 to use the allocated wireless resources.

The wireless resource allocation unit 220 performs scheduling to enhance the total throughput while maintaining fairness between the respective wireless terminals 120. More specifically, the wireless resource allocation unit 220 determines, for example, the volume of data (packets) to be sent to each wireless terminal 120, the communication rate and delay time required in accordance with the type of service (for example, data communication or audio communication), and the transmission state of each wireless terminal 120. The wireless resource allocation unit 220 allocates wireless resources to each wireless terminal 120 in accordance with the determination results.

The access point control unit 222 (wireless device control means) has the function of monitoring and controlling each access point 300. The access point control unit 222 transmits a monitoring/controlling signal for monitoring and controlling the access point 300 to the access point 300 via the transmission line interface 206 and the transmission line 110.

The access point control unit 222 performs processing to control the parts constituting the center node 200 and to cause the plurality of access points 300 to perform cooperative operations. More specifically, the following processing is performed.

When the access point 300 with the best radio channel quality is different between the upstream and downstream channels, the access point control unit 222 may perform control to use different access points 300 in the upstream and downstream channels. For example, the access point 300-2 (access point #2) may receive an ACK/NACK signal indicating whether the wireless terminal 120 has successfully received downstream data transmitted from the access point 300-1 (access point #1) to the wireless terminal 120. In this case, the access point control unit 222 may perform control to select access point #1 via the downstream channel and select access point #2 via the upstream channel. Thus, the center node 200 (access point control unit 222) can determine whether to transmit new data or to retransmit old data next.

When a certain wireless terminal 120 is located near the boundary between the areas (cells) of a plurality of access points 300 (access points #1 and #2), the access point control unit 222 may control the plurality of access points 300 to simultaneously transmit the same data using the same frequencies. Since the data redundancy can thus be increased, the reception quality of the wireless terminal 120 can be improved. In this case, the access point control unit 222 may perform control to match the methods for using wireless resources at the plurality of access points 300. The access point control unit 222 may further perform control to distribute data from the center node 200 to each access point 300 (access points #1 and #2) to enable the respective access points 300 to transmit the same data at the same timing.

When a certain wireless terminal 120 is located near the boundary between the areas (cells) of a plurality of access points 300 (access points #1 and #2), the access point control unit 222 may perform control to transmit data from only an access point 300 with the best radio channel quality. In this case, the access point control unit 222 may control other access points 300 to stop using a wireless resource which causes interference. This can improve the reception quality of the wireless terminal 120.

When a certain wireless terminal 120 is located near the boundary between the areas (cells) of a plurality of access points 300 (access points #1 and #2), the access point control unit 222 may perform control to simultaneously transmit different data using different frequencies from the plurality of access points 300. The "different data" mean herein respective pieces of sub-data obtained by dividing user data. This can implement carrier aggregation between the access points 300 to improve the throughput of the wireless terminal 120.

When a certain wireless terminal 120 is located near the boundary between the areas (cells) of a plurality of access points 300 (access points #1 and #2), the access point control unit 222 may perform control to simultaneously transmit different data using the same frequencies from the plurality of access points 300. This can implement MIMO communication between the access points 300 to improve the throughput of the wireless terminal 120.

When the position of the wireless terminal 120 is unclear, one access point 300 with the best quality may not be determined. The case where the position of the wireless terminal 120 is unclear means herein the case where, for example, the moving speed of the wireless terminal 120 is high, a case where a wireless terminal 120 which has not been used for communication for a while newly starts communication, or the like. In such a case, the access point control unit 222 may perform control to simultaneously transmit the same data using the same frequencies from the plurality of access points 300. Since the data redundancy can thus be increased, data can be reliably transmitted to the wireless terminal 120.

The software 210 performs at least one process associated with the layer 2 protocol illustrated in FIG. 3 (processes associated with PDCP, RLC, and MAC) other than the above-mentioned process. Processes such as the above-mentioned access point selection, wireless resource selection, and cooperative operations between the access points 300 are too complex to be processed by hardware. In other words, the above-mentioned processing is suitable as software processing which uses the general-purpose server 204 equipped with a general-purpose processor. In the present exemplary embodiment, therefore, the above-mentioned processing can be efficiently performed.

Figure 6:
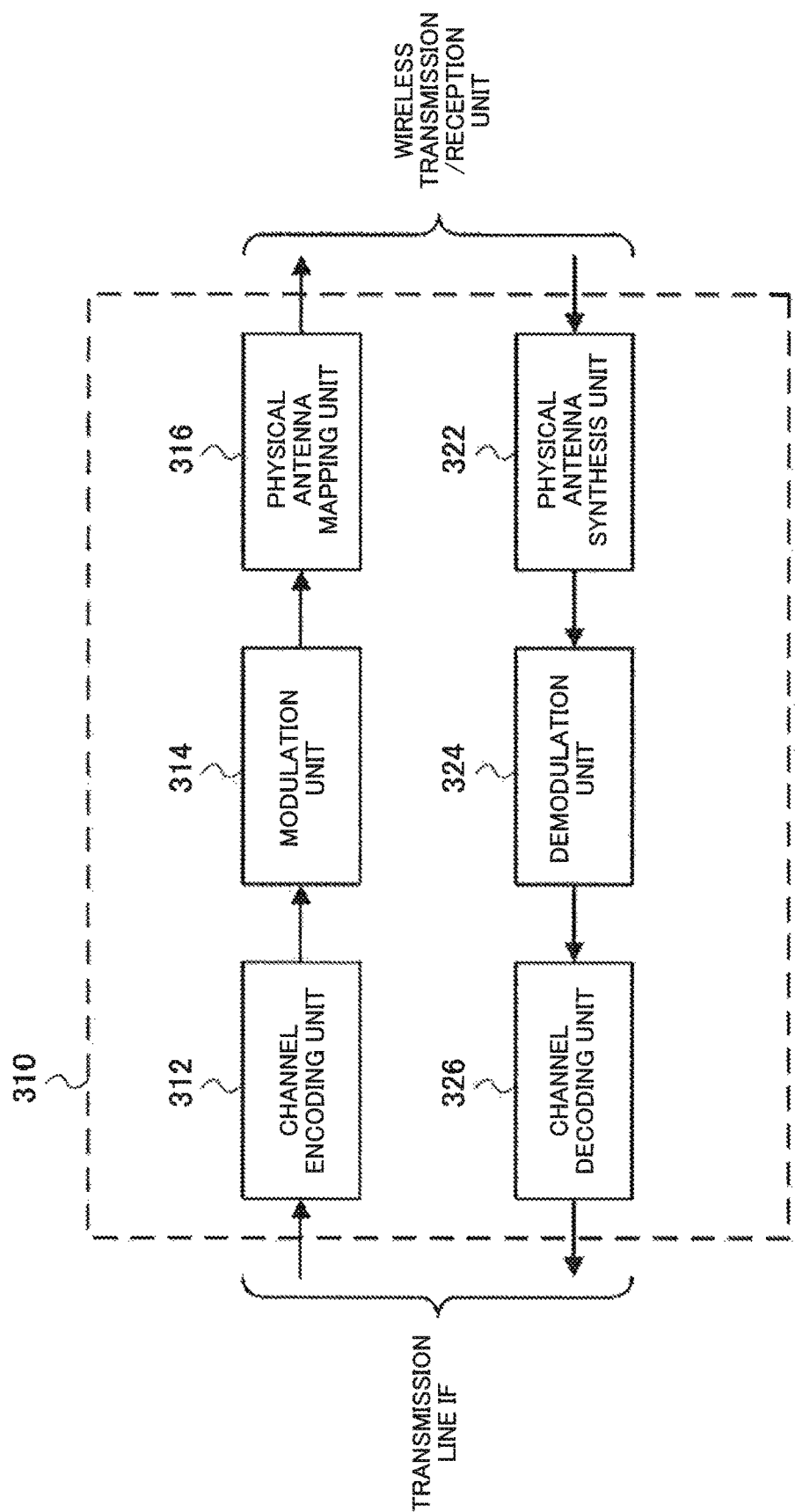
FIG. 6 is a block diagram illustrating the configuration of a wireless signal processing unit according to the first exemplary embodiment.

FIG. 6 is a block diagram illustrating the configuration of the wireless signal processing unit 310 according to the first exemplary embodiment. The wireless signal processing unit 310 includes a channel encoding unit 312, a modulation unit 314, a physical antenna mapping unit 316, a physical antenna synthesis unit 322, a demodulation unit 324, and a channel decoding unit 326.

The wireless signal processing unit 310 performs transmission processing associated with the layer 1 protocol on downstream user data (MAC_PDU). The wireless signal processing unit 310 converts the user data into a baseband signal by transmission processing. The wireless signal processing unit 310 then transmits the baseband signal to the wireless transmission/reception unit 304. More specifically, the channel encoding unit 312 performs channel encoding processing on the downstream user data (MAC_PDU) received by the transmission line interface 302 via the transmission line 110. The modulation unit 314 performs modulation processing on the data having undergone the channel encoding processing. Note that the modulation unit 314 may perform modulation processing using the OFDM (Orthogonal Frequency Division Multiplexing) scheme.

The physical antenna mapping unit 316 (antenna weighting means) performs transmission antenna weighting processing for each antenna of the antenna 306 including a plurality of antennas, for the data having undergone the modulation processing. The transmission antenna weighting processing means herein processing for controlling the amplitude/phase for each of a plurality of antenna elements constituting the antenna 306.

The wireless transmission/reception unit 304 converts the baseband signal having undergone the transmission antenna weighting processing into a wireless signal. The wireless transmission/reception unit 304 transmits a wireless signal to each wireless terminal 120 via the antenna 306.

The wireless transmission/reception unit 304 receives an upstream signal (wireless signal) from each wireless terminal 120 via the antenna 306. The wireless transmission/reception unit 304 converts the upstream signal into a digital baseband signal.

The wireless signal processing unit 310 performs reception processing associated with the layer 1 protocol on the upstream signal (baseband signal). The wireless signal processing unit 310 converts the baseband signal into user data (MAC_PDU) by the reception processing and transmits the user data to the transmission line interface 302.

More specifically, the physical antenna synthesis unit 322 performs reception antenna weighting processing for each antenna of the antenna 306 including a plurality of antennas, for the baseband signal. The reception antenna weighting processing means herein processing for multiplying an amplitude/phase different for each of a plurality of antenna elements constituting the antenna 306 and then summing signals received by all antennas. The demodulation unit 324 performs demodulation processing on the signal having undergone the reception antenna weighting processing. Note that the demodulation unit 324 may perform demodulation processing using the OFDM scheme. The channel decoding unit 326 performs channel decoding processing on the signal having undergone the demodulation processing. The transmission antenna weighting processing and the reception antenna weighting processing will be collectively referred to as antenna weighting processing hereinafter.

Wireless resources used in transmission and reception to and from each wireless terminal 120 are used in accordance with an instruction from the center node 200. In other words, the access point 300 receives a wireless resource instruction signal from the center node 200. The wireless signal processing unit 310 and the wireless transmission/reception unit 304 perform appropriate processing in accordance with the received wireless resource instruction signal.

In the present exemplary embodiment, MAC_PDU (Transport Block) serving as user data is transmitted on the transmission line 110 connecting the center node 200 to the access point 300, as described above. In contrast to this, in the above-mentioned related-art technique, the device (for example, the BDE, the REC, and the master device) on the center side performs digital signal processing. Therefore, a baseband signal is transmitted on a transmission line connecting the device on the center side to the device on the antenna side. The baseband signal has a data volume larger than that of MAC_PDU.

In the present exemplary embodiment, not the center node 200 but the access point 300 performs at least one of antenna synthesis processing (for example, beam forming and MIMO precoding) such as antenna weighting processing, modulation/demodulation processing, and channel encoding/decoding processing that result in an increased data rate, as described above. Therefore, in the wireless communication system 100 according to the present exemplary embodiment, the data rate of the transmission line 110 between the center node 200 and the access point 300 can be reduced.

Hence, even when the radio bandwidth or the number of antennas considerably increases, a data rate required in the transmission line between the center node 200 and the access point 300 can be economically attained using only a small number of optical fibers. In the above-mentioned related-art technique, accommodating strained mobile data communication may enormously raise the data rate required in the transmission line between the wireless control unit (for example, REC) on the center side and the wireless unit (for example, RE) on the antenna side, thus hindering economical accommodation using only a small number of optical fibers.

Methods for considerably increasing the radio capacity of mobile data communication include a method for using a frequency bandwidth wider than that in the conventional cases, and a method for using antennas larger in number than the conventional cases to increase the order of spatial multiplexing (for example, beam forming and multi-user MIMO).

In the above-mentioned related-art technique, however, the data rate in the transmission line between the wireless control unit (for example, REC) on the center side and the wireless unit (for example, RE) on the antenna side increases in proportion to the product of the bandwidth and the number of antennas. For example, the specification of an LTE channel bandwidth of 20 MHz/2 antennas (2×2 MIMO) that is the current standard configuration requires a data rate of about 2 Gbps. On the other hand, when the specification increases to 100 MHz/128 antennas, a data rate of 640 Gbps, that is, 2 Gbps×320 is required. This data rate considerably falls outside the range in which it can be economically attained, even when optical fibers are used.

As another method for considerably increasing the radio capacity, a method for increasing the number of antenna sites or the like is available. In this case, the data rate in the transmission line between the wireless control unit (for example, REC) on one center side and the wireless unit (for example, RE) on the antenna side remains the same. However, the number of optical fibers connected to the wireless control unit (for example, REC) on the center side increases in proportion to the number of antenna sites. Therefore, the total data rate per wireless control unit (for example, REC) on the center side considerably increases.

In the present exemplary embodiment, for the specification of an LTE channel bandwidth of 20 MHz/2 antennas (2×2 MIMO), the peak throughput of user data is about 150 Mbps. This data rate is considerably lower than a bit rate of about 2 Gbps that is required in the above-mentioned related-art technique that employs CPRI as the standard of a transmission line. Especially when the specification increases to a wide bandwidth (for example, 100 MHz)/multiple antennas (for example, 128 elements), the bit rate becomes about 640 Gbps, thus hindering economical signal transmission using only a small number of optical fibers, as described above, in the above-mentioned related-art technique. In contrast to this, in the present exemplary embodiment, since, as described above, the bit rate can be considerably reduced, 10-Gbps Ethernet (10 GBASE-SR/LR) or 40-Gbps Ethernet (40 GBASE-LR4), for example, can be employed as the specification of a transmission line. This allows economic data transmission.

In the present exemplary embodiment, as described above, since the bit rate in the transmission line 110 between the center node 200 and the access point 300 can be lowered, the delay in the transmission line can be reduced. When LTE is used as a radio scheme, user data is scheduled for each subframe having a period of 1 ms. Accordingly, the delay in the transmission line needs to be sufficiently shorter than 1 ms. This is because the radio channel quality varies with time due, for example, to fading. Therefore, even if the center node 200 schedules (selects) the best access point and wireless resources, it is highly probable that the selected access point and wireless resources will not always be best at the time of their actual use because of the significant delay.

The delay of the transmission line needs to be short for the following reason as well. In FDD of LTE, HARQ (Hybrid ARQ) uses the stop and wait scheme in eight processes. In this case, when the cycle of transmission (downstream), an ACK/NACK response (upstream), and retransmission (downstream) exceeds eight subframes (8 ms), it is no longer possible to continuously transmit data. Thus, the peak throughput per wireless terminal 120 is lowered. When, for example, the transmission delay of an optical fiber is about 5 μs/km and the maximum length of the optical fiber is 20 km, the maximum delay is 100 μs.

Therefore, the delay of the transmission line needs to be short. HARQ will be described later in other exemplary embodiments.

In the present exemplary embodiment, as a transmission line interface between the center node 200 and the access point 300, the medium having a general-purpose specification (for example, Ethernet) is usable. A general-purpose server (general-purpose server 204) normally includes an interface such as Ethernet. This obviates the need to add a special transmission line interface circuit. This can reduce the cost of transmission lines. Similarly, general-purpose components are usable even for the access points 300.

In the above-mentioned related-art technique, CPRI is employed as the standard of a transmission line. CPRI is a dedicated specification used only at the interface between the wireless control unit (for example, REC) on the center side and the wireless unit (for example, RE) on the antenna side, and is incompatible with a standard interface specification (for example, Ethernet) used for various other purposes. Therefore, in the above-mentioned related-art technique, the need to develop dedicated hardware/software entails higher costs of development, and the impossibility of sharing such hardware/software with other systems increases the costs. For example, since a general-purpose server includes no CPRI interface and therefore cannot be used directly, a dedicated CPRI interface needs to be added.

In the present exemplary embodiment, as a transmission line interface between the center node 200 (for example, REC) and the access point 300 (for example, RE), the medium having a general-purpose specification is usable, as described above. The costs of development can thus be lowered while the costs of components can be cut by sharing.

In the above-mentioned related-art technique, when processing in the wireless control unit (for example, REC) on the center side, especially wireless signal processing (layer 1: physical layer processing), is performed by a general-purpose processor (general-purpose server), the processing load becomes very high. This poses a problem such as arising of the need of a very large number of processors or the need to wait until the processing capacity of the general-purpose processor significantly improves.

Signal processing (for example, Turbo error correction processing, FFT/IFFT processing, and matrix operation processing for MIMO) unique to mobile wireless signal processing is very large in amount. When the radio bandwidth/number of antennas considerably increases, data having a volume of 640 Gbps per antenna site needs to be handled, as described above, and memory and bus bottlenecks occur in the processor. In addition, the mobile wireless signal processing includes arithmetic operations which are bit arithmetic processing very easy (efficiently executable) in hardware implementation but are not suitable for a general-purpose processor (lead to a very poor efficiency of use of a 64-bit arithmetic device), such as error coding processing, bit interleaving, and CRC (Cyclic Redundancy Check). Therefore, when these types of processing are performed by a general-purpose processor (general-purpose server), the processing load becomes very high.

In the present exemplary embodiment, the center node 200 (for example, REC) can be easily implemented by a general-purpose processor (general-purpose server 204), as described above. In the present exemplary embodiment, the center node 200 (for example, REC) performs processing which can be efficiently performed by a general-purpose processor. On the other hand, the access point 300 (or a relay node described later) implemented as dedicated hardware performs wireless signal processing performed poorly (with poor processing efficiency) by the general-purpose server 204. In this manner, functions are shared between the center node 200 and the access point 300. Thus, the center node 200 (for example, REC) can be easily implemented by a general-purpose processor (general-purpose server 204). In addition, implementing functions by the software 210 on the general-purpose server 204 enables not only a reduction in cost but also improvements in scalability, software portability, and functional flexibility. Details will be described later.

Again in the present exemplary embodiment, while enjoying the above-mentioned advantageous effects in the present exemplary embodiment, free, close cooperative operations between the access points 300 can be performed (that is, limitations can be prevented from imposed on the cooperative operations), as described above. For example, not only cooperation schemes currently available in the 3GPP standard, such as inter-site carrier aggregation, CoMP (Coordinated Multi-Point Transmission/reception), ICIC (Inter-Cell Interference Coordination), and Dual Connectivity, but also cooperation schemes expected to be needed in the future can be freely realized. This is because the wireless resources can be totally managed in real time at the center node 200 (the advantages of the conventional remote radio head techniques can be sustained without any change).

(Second Exemplary Embodiment)

A second exemplary embodiment will be described next.

Figure 7:
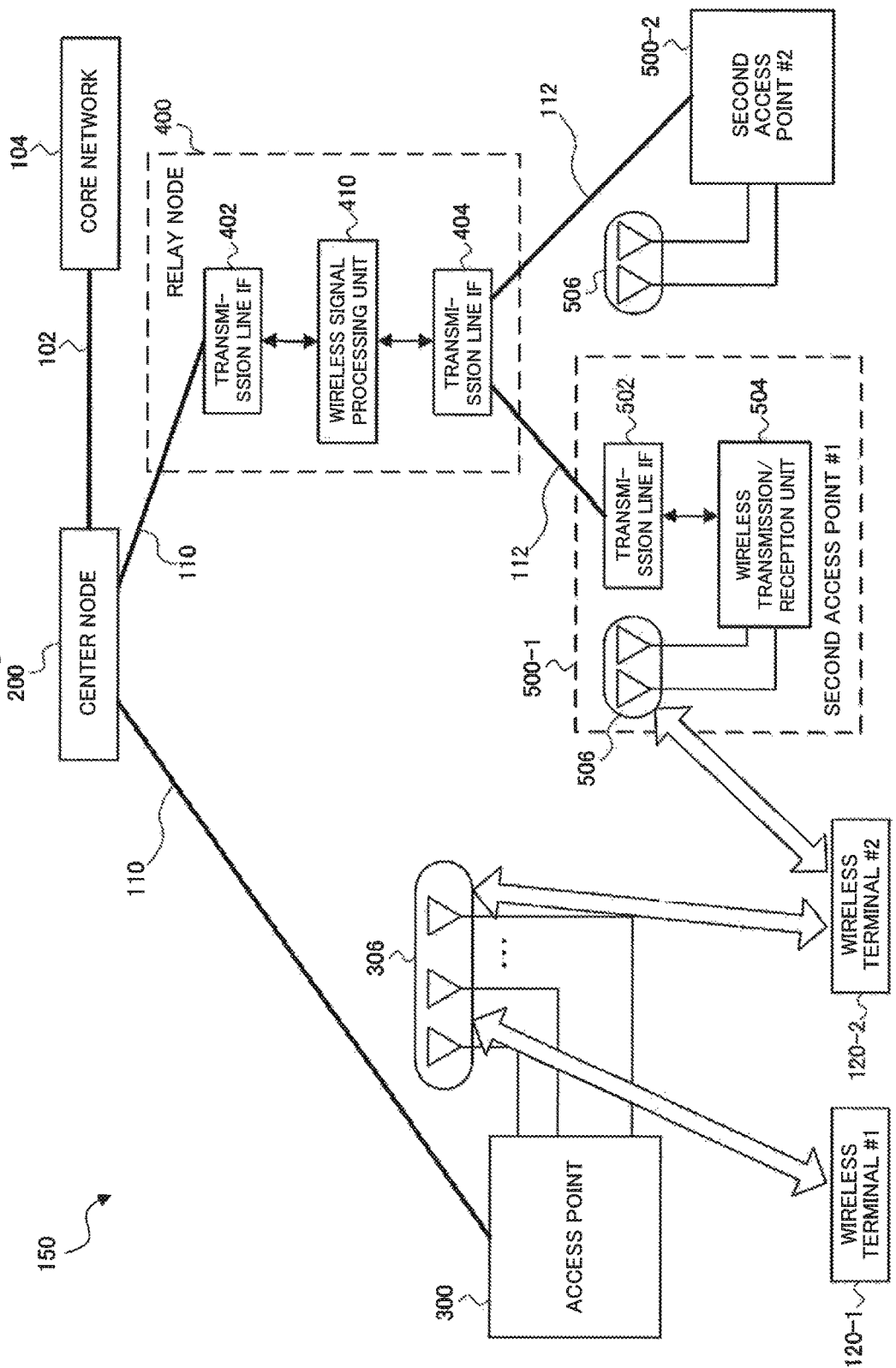
FIG. 7 is a diagram illustrating a wireless communication system according to a second exemplary embodiment.

FIG. 7 is a diagram illustrating a wireless communication system 150 according to a second exemplary embodiment. The wireless communication system 150 may serve as, for example, a radio access network. The wireless communication system 150 includes a center node 200, one or more access points 300, one or more relay nodes 400 (relay devices), and second access points 500-1 (second access point #1) and 500-2 (second access point #2). A plurality of wireless terminals 120-1 (wireless terminal #1) and 120-2 (wireless terminal #2) wirelessly communicate with the wireless communication system 150. The same reference numerals denote components which are almost the same as those in the above-described exemplary embodiment, and a description thereof will not be given (the same applies hereinafter).

The relay node 400 is interposed between the center node 200 and the second access point 500. The relay node 400 is located at a position physically distanced from the center node 200 and the second access point 500. The relay node 400 is connected to the center node 200 via a transmission line 110. The relay node 400 is further connected to the second access point 500 via a transmission line 112.

Although FIG. 7 depicts two second access points 500, the present invention is not limited to this. One or three or more second access points 500 may be used. Similarly, although FIG. 7 depicts one relay node 400, the present invention is not limited to this. Two or more relay nodes 400 may be used. The same applies to other exemplary embodiments.

The wireless terminal 120 exchanges wireless signals with the access point 300 and the second access point 500. How to use the frequencies in the access point 300 and the second access point 500, how to transmit data, how to use the frequencies among the plurality of wireless terminals 120, and the like are the same as those in the first exemplary embodiment.

The relay node 400 includes a transmission line interface 402, a wireless signal processing unit 410, and a transmission line interface 404. The second access point 500 includes a transmission line interface 502, a wireless transmission/reception unit 504, and an antenna 506. In other words, in the second exemplary embodiment, the second access point 500 includes no wireless signal processing unit. Instead, the relay node 400 includes a wireless signal processing unit 410.

The function of the second access point 500 may be the same as that of the remote radio equipment (RRE) or the radio equipment (RE) described in the above-mentioned non-patent literatures. Note, however, that the bandwidth/number of antennas and the like applied to the second access point 500 are not always be the same as those of the remote radio equipment (RRE) or the radio equipment (RE). When the bandwidth/number of antennas are very large, the function of the wireless signal processing unit 410 located at the relay node 400 may be partially implemented by the second access point 500.

The transmission line interface 402 of the relay node 400 has the same function as that of the transmission line interface 302 according to the first exemplary embodiment. The wireless signal processing unit 410 has the same function as that of the wireless signal processing unit 310 according to the first exemplary embodiment. In other words, the relay node 400 executes the function of the wireless signal processing unit 310 located at the access point 300, in place of the second access point 500. The transmission line interface 404 performs processing according to the standard of the transmission line 112 in exchanging signals (data) with the second access point 500 via the transmission line 112.

Wireless resources used in transmission and reception to and from each wireless terminal 120 are used in accordance with an instruction from the center node 200. In other words, the center node 200 transmits a wireless resource instruction signal to the relay node 400. The relay node 400 receives the wireless resource instruction signal from the center node 200. The wireless signal processing unit 410 performs appropriate processing to enable the second access point 500 to transmit and receive signals, in accordance with the received wireless resource instruction signal.

The transmission line 112 serves as a medium for transmitting information, such as an optical fiber, a metal cable, or radio. As described above, the function of the second access point 500 is the same as that of the remote radio equipment (RRE) or the radio equipment (RE) described in the non-patent literatures. Therefore, the transmission line 112 may be compliant with, for example, CPRI to connect the second access point 500 to the relay node 400. However, the transmission line 112 may not be compliant with, for example, CPRI. When, for example, the function of the wireless signal processing unit 410 of the relay node 400 is partially implemented by the second access point 500 (for example, the case illustrated in FIG. 18 (to be described later)), the transmission line 112 may be compliant with Ethernet.

The transmission line interface 502 of the second access point 500 performs processing according to the standard of the transmission line 112 in exchanging signals (data) with the relay node 400 via the transmission line 112. The wireless transmission/reception unit 504 has the same function as that of the wireless transmission/reception unit 304 according to the first exemplary embodiment. In other words, the wireless transmission/reception unit 504 converts a digital signal (baseband signal) into a wireless signal (RF) and converts a wireless signal into a digital signal (baseband signal). The antenna 506 includes a plurality of antennas and may be implemented in, for example, an antenna array including a plurality of antenna elements, like the antenna 306 according to the first exemplary embodiment.

The operation of the center node 200 is the same as that of the center node 200 according to the first exemplary embodiment. Note that the center node 200 performs the above-mentioned processing without distinction between the access point 300 directly connected to the center node 200 and the second access point 500 connected to the center node 200 via the relay node 400. In other words, the center node 200 can perform cooperative operations without distinction, even between access points having different functions, including the access point 300 equipped with the wireless signal processing unit 310 and the second access point 500 equipped with no wireless signal processing unit.

The wireless terminal 120 communicates with a radio access network (wireless communication system 150) via one or more access points (access point 300 and second access points 500-1 and 500-2). The operation of the wireless terminal 120 is the same as that of the wireless terminal 120 according to the first exemplary embodiment. Note that the wireless terminal 120 performs communication without distinction with the access point 300 directly connected to the center node 200 and the second access point 500 connected to the center node 200 via the relay node 400. In other words, the wireless terminal 120 can communicate, without distinction, with access points having different functions, including the access point 300 equipped with the wireless signal processing unit 310 and the second access point 500 equipped with no wireless signal processing unit.

In the second exemplary embodiment, some or all of the functions of the wireless signal processing unit 310 located at the access point 300 are separated and located at the relay node 400, as described above. This can increase the degrees of freedom of the positions to locate devices, the data rates of transmission lines, the sharing of processing resources, and the like. The relay node 400 may be located near the center node 200 or near the second access point 500 in accordance with, for example, use purposes.

The relay node 400 is located near the center node 200 to offer the following advantage: even when the function of the center node is changed from the function of the radio base station digital processing equipment (BDE) or the wireless control unit (REC) in the above-mentioned related-art technique to function of the center node 200 according to the present exemplary embodiment, the remote radio equipment (RRE) or the radio equipment (RE) in the above-mentioned related-art technique can be continuously used without any change. In this case, although the effect of lowering the bit rate in the transmission line 112 lessens, the bit rate in the transmission line 112 need not be lowered any more as long as the existing transmission line poses no problems related to the bit rate.

The relay node 400 is located near the plurality of second access points 500-1 and 500-2 to offer the following advantage: the transmission line (transmission line 110) between the center node 200 and the second access point 500 can be shared between the plurality of second access points 500-1 and 500-2. This may obviate the need to separately provide a transmission line, thus reducing the costs. In the transmission line 112 between the relay node 400 and the second access point 500, a baseband signal (IQ sample) having a large data volume is transmitted. Therefore, the transmission line 112 requires a high bit rate. However, when the relay node 400 is located near the second access point 500 (for example, both devices are located on the same floor of one building or in an underground mall passageway), the cost of the transmission line 112 has less impact.

Figure 8:
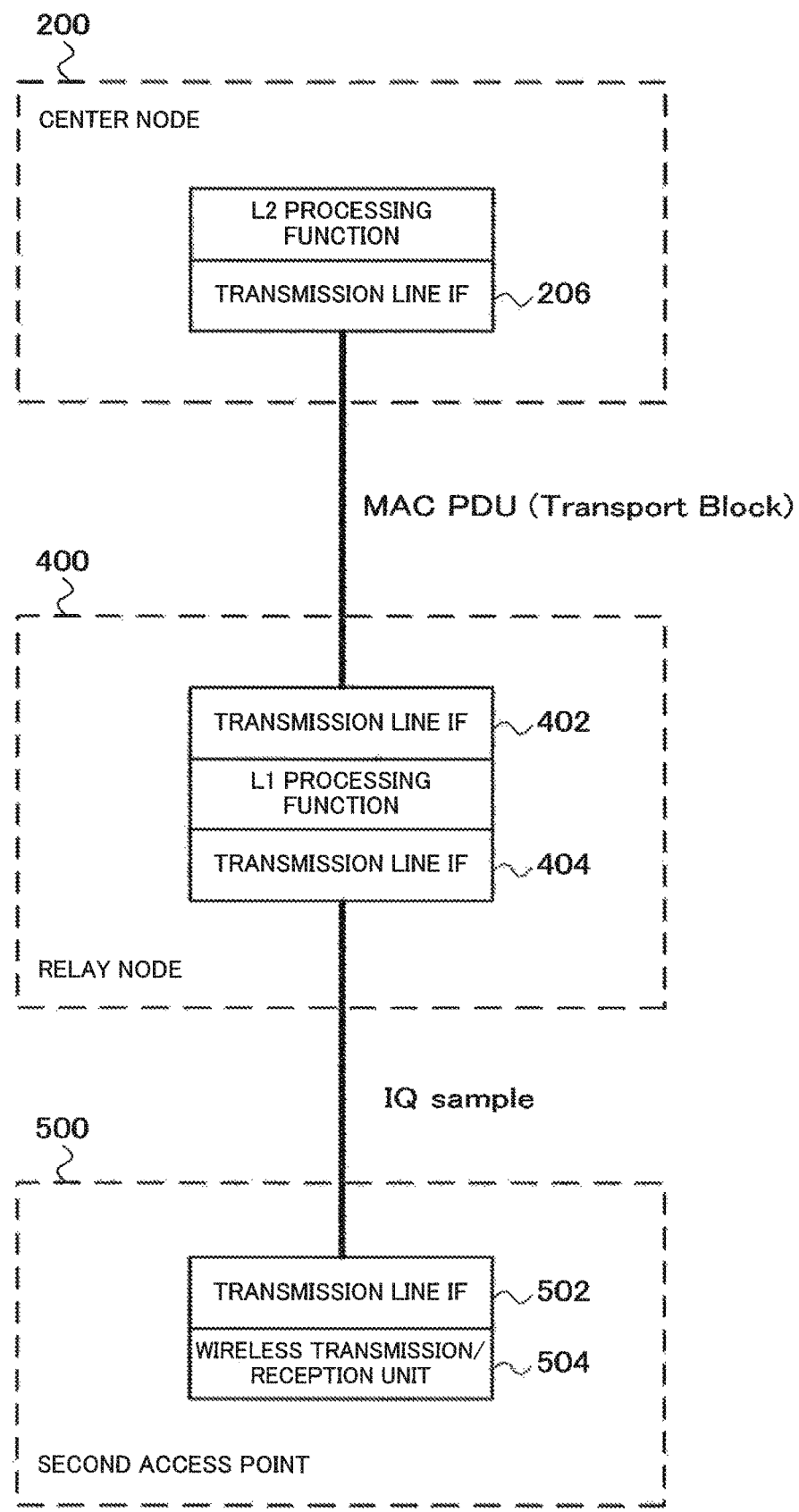
FIG. 8 is a diagram illustrating how protocol processing functions are shared among a center node, a relay node, and a second access point according to the second exemplary embodiment.

FIG. 8 is a diagram illustrating how protocol processing functions are shared among the center node 200, the relay node 400, and the second access point 500. As in the first exemplary embodiment, an L2 processing function is located at the center node 200 and implemented by the software 210 running on the general-purpose server 204. An L1 processing function is located at the relay node 400 and implemented by the wireless signal processing unit 410. Further, MAC_PDU (Transport Block) serving as user data is transmitted on the transmission line 110 connecting the center node 200 to the relay node 400. An antenna-specific IQ sample (digital baseband signal) is transmitted on the transmission line 112 connecting the relay node 400 to the second access point 500.

The transmission line 110 between the center node 200 and the relay node 400 is compliant with, for example, Ethernet, as described above. The transmission line 112 between the relay node 400 and the second access point 500 is compliant with, for example, CPRI. In this case, the remote radio equipment (RRE) or the radio equipment (RE) described in the non-patent literatures, for example, is usable as the second access point 500.

(Third Exemplary Embodiment)

A third exemplary embodiment will be described next. The third exemplary embodiment exemplifies a specific configuration of each device according to the above-mentioned exemplary embodiment when LTE is employed as a radio scheme.

Figure 9:
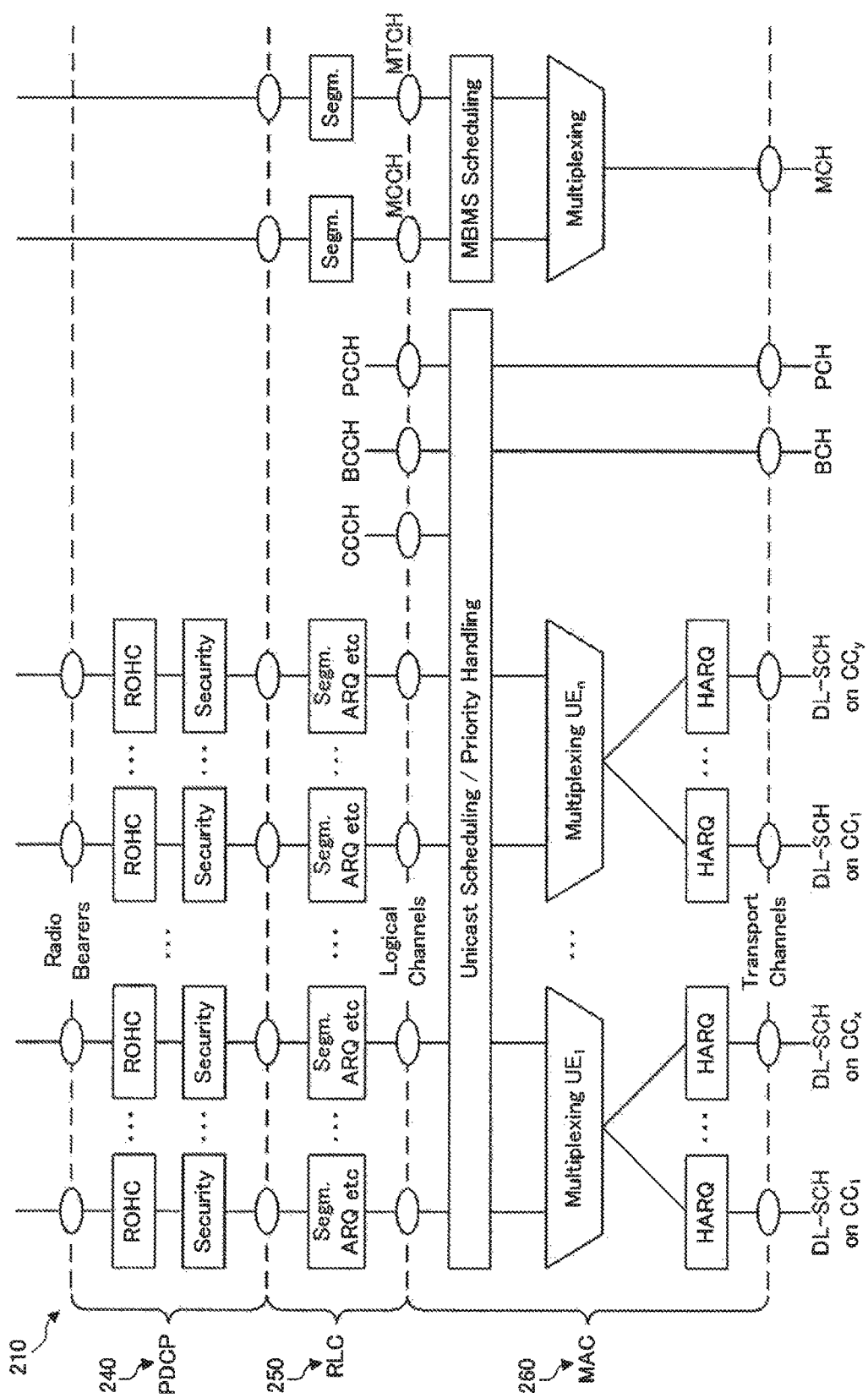
FIG. 9 is a diagram illustrating an exemplary specific configuration of software running at a center node according to a third exemplary embodiment.
Figure 10:
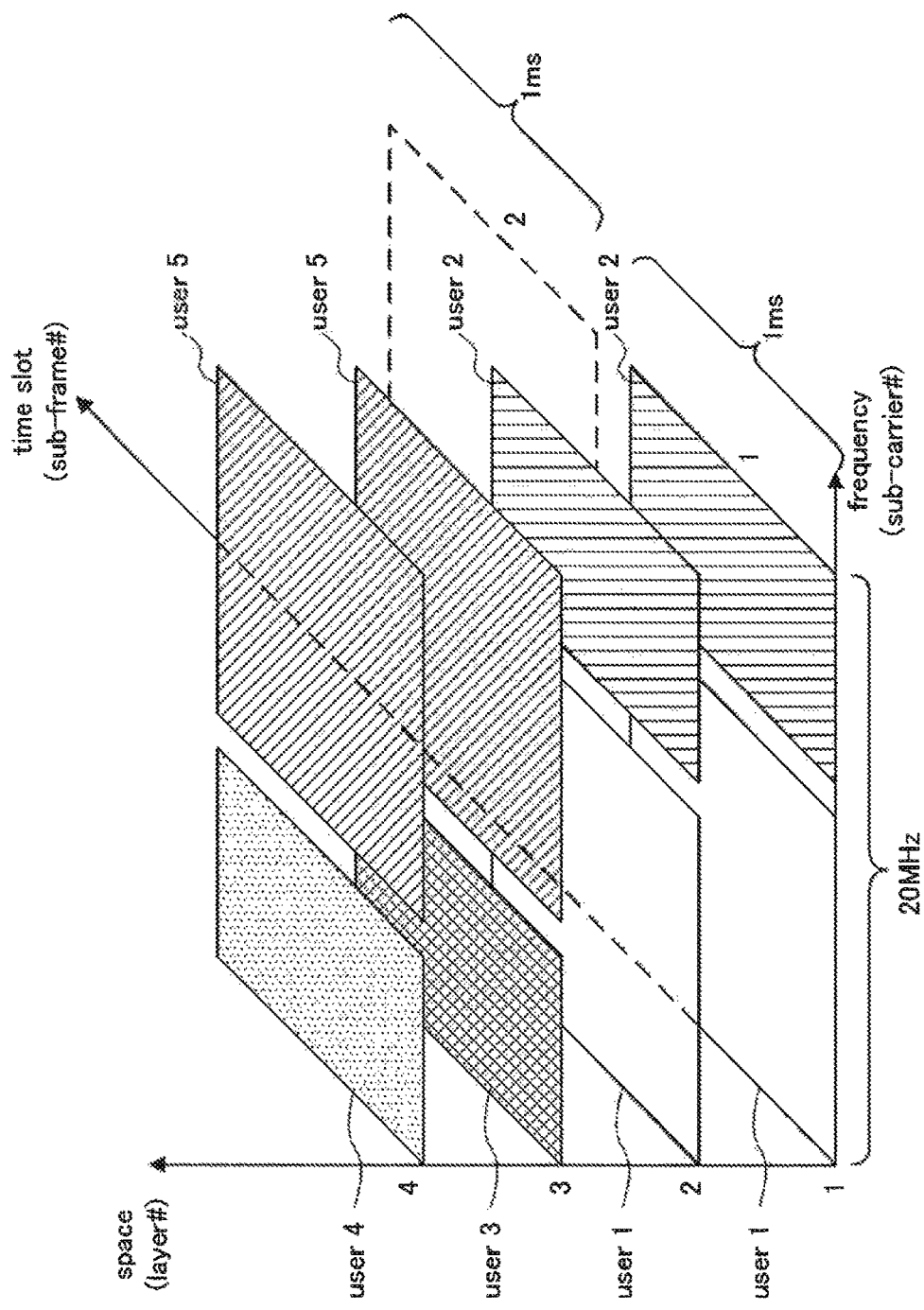
FIG. 10 is a diagram illustrating an exemplary state in which wireless resources are allocated to a plurality of users.

FIG. 9 is a diagram illustrating an exemplary specific configuration of software 210 running at a center node 200 according to the third exemplary embodiment. The configuration illustrated in FIG. 9 is the configuration of the layer 2 protocol (downstream link) described in NPL 4. The layer 2 protocol includes no signal processing (for example, layer 1 protocol processing) unique to radio. Therefore, the layer 2 protocol processing described in NPL 4 can be implemented by the software 210 running on a general-purpose server 204 of the center node 200. The software 210 allocates wireless resources to each user (wireless terminal 120), as illustrated in FIG. 10 (to be described later), by the processing illustrated in FIG. 9.

The software 210 includes a PDCP processing unit 240, an RLC processing unit 250, and a MAC processing unit 260, as illustrated in FIG. 9. The PDCP processing unit 240 performs processing associated with a PDCP sublayer. The PDCP sublayer includes herein the "ROHC (Robust Header Compression)" and "Security" functions. In other words, the PDCP processing unit 240 executes the "ROHC" and "Security" functions. The RLC processing unit 250 performs processing associated with an RLC sublayer. The RLC sublayer includes herein, for example, the "Segmentation" and "ARQ (Automatic Repeat Request)" functions. In other words, the RLC processing unit 250 executes, for example, the "Segmentation" and "ARQ (Automatic Repeat Request)" functions. The MAC processing unit 260 performs processing associated with a MAC sublayer. The MAC sublayer includes herein, for example, the scheduling function ("Unicast Scheduling/Priority Handling" and "MBMS (Multimedia Broadcast and Multicast Service)" functions), the multiple division function ("Multiplexing" function) executed when a plurality of logical channels are used for one wireless terminal 120 (UE), and the "HARQ (Hybrid Automatic Repeat Request) function. In other words, the MAC processing unit 260 executes, for example, the scheduling, multiple division, and "HARQ" functions.

The MAC scheduling function is the function of determining which wireless resources are used for which wireless terminals, with the subframe (1 ms) period to enhance the efficiency of use of wireless resources in consideration of the level of priority and the fairness between users. In the present exemplary embodiment, the MAC scheduling function is implemented by the general-purpose server 204 (software 210) of the center node 200. In other words, the center node 200 collectively allocates wireless resources to a plurality of access points (access points 300 or second access points 500). A plurality of hierarchical levels may be defined for each cell, each access point, inter-access point adjustment, and the like and distributed scheduling may be performed for each level to allow distributed processing by a plurality of processors.

As described above, processing associated with the layer 2 protocol is implemented by the software 210 running on the general-purpose server 204. When processing is too much to be performed using only one general-purpose server equipped with one or more general-purpose CPUs, processing associated with the layer 2 protocol may be implemented by the general-purpose server 204 formed by a group of general-purpose servers including a plurality of servers. The number of access points 300 connected to one center node 200 is not particularly fixed, and the number of access points 300 increases with an increase in traffic. Hence, with an increase in number of access points 300, the general-purpose server 204 may be desirably scaled up. Thus, in the present exemplary embodiment, the number and processing capacity of servers constituting the general-purpose server 204 of the center node 200 can be easily changed. In other words, the center node 200 according to the present exemplary embodiment has scalability. Further, in the present exemplary embodiment, it is easily possible not only to increase the number of servers constituting the general-purpose server 204 but also to replace the existing server with a server having a high processing capacity. In other words, the center node 200 according to the present exemplary embodiment has portability.

Individual servers constituting the general-purpose server 204 are connected to each other via a network within the center node 200 such as Ethernet and exhibit a given processing capacity as a whole. The software 210 running on the center node 200 may be allocated to each physical server or CPU in advance or allocated with dynamic changes in accordance with the traffic. The software 210 can run on a more flexible processing resource by activating it on a virtual machine virtualized by a hypervisor.

FIG. 10 is a diagram illustrating an exemplary state in which wireless resources are allocated to a plurality of users. FIG. 10 illustrates an exemplary case where wireless resources (time slot, frequency, and space) associated with each access point 300 are allocated to a plurality of users (wireless terminals 120). With the above-mentioned processing of the software 210, wireless resources are allocated to each user (wireless terminal 120), as illustrated in FIG. 10. Further, wireless resources are defined by three dimensions: the time slot (subframe), the frequency (subcarrier), and the space (layer), as illustrated in FIG. 10.

The time slot (subframe) will be described hereinafter.

Figure 11:
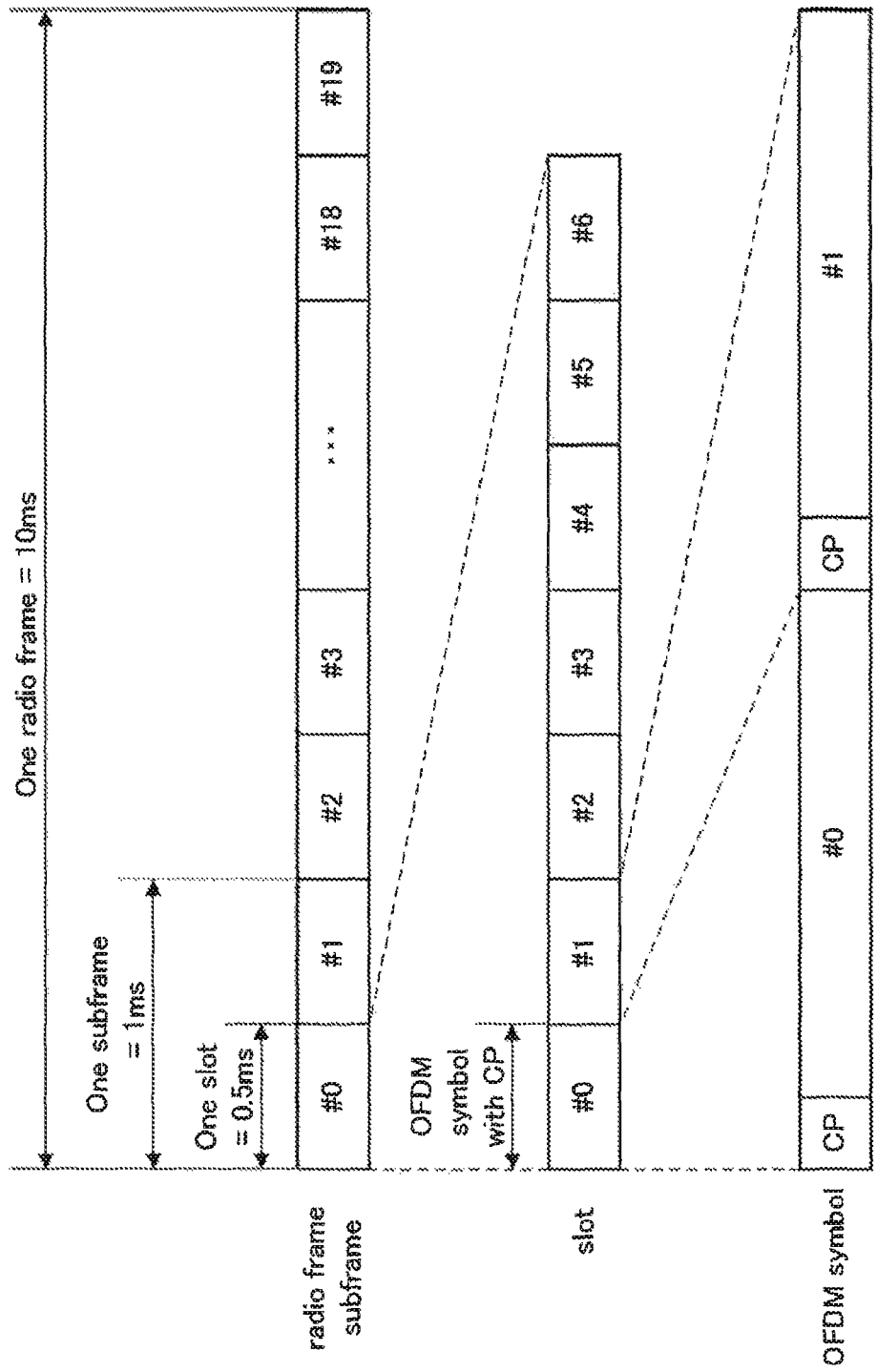
FIG. 11 is a diagram illustrating an exemplary frame format.

FIG. 11 is a diagram illustrating an exemplary frame format. The exemplary frame format illustrated in FIG. 11 is employed in LTE. The length of one radio frame is 10 ms (milliseconds). One radio frame includes 10 subframes each having a length of 1 ms. The subframe includes two slots (time slots) each having a length of 0.5 ms. In other words, one radio frame includes 20 slots (#0 to #19). One slot includes seven OFDM symbols (#0 to #6). One OFDM symbol is formed by adding a CP (Cyclic Prefix) to effective data. The "slot" is defined as the minimum unit (corresponding to a resource element (to be described later)) of the allocated wireless resource.

The subcarrier will be described next.

Figure 12:
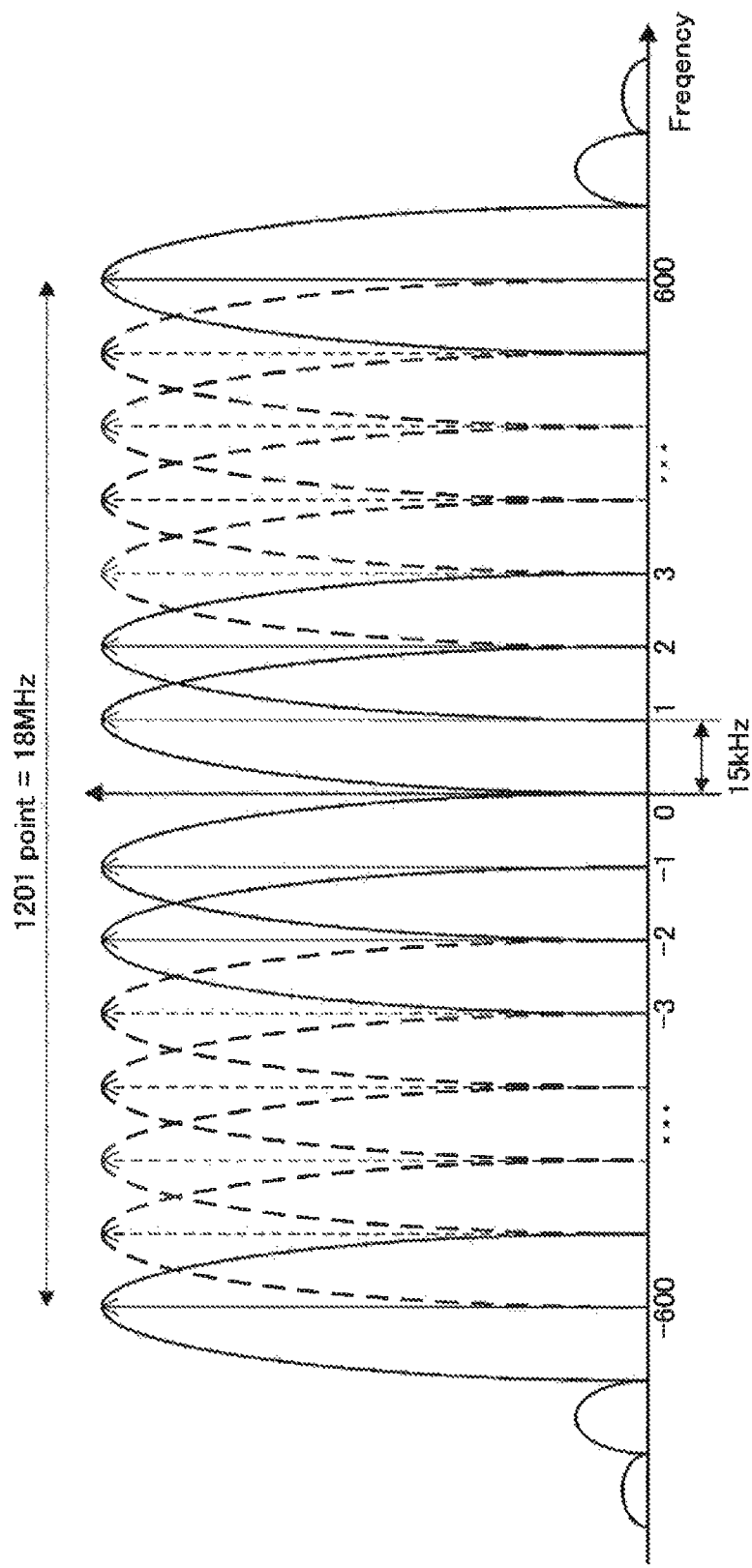
FIG. 12 is a diagram illustrating a plurality of exemplary subcarriers.

FIG. 12 is a diagram illustrating a plurality of exemplary subcarriers. LTE uses the OFDM scheme of a plurality of subcarriers, as an example illustrated in FIG. 12. In the example illustrated in FIG. 12, when the bandwidth is 18 MHz and the interval of subcarriers is 15 kHz, this bandwidth includes 1,200 subcarriers (because of the use of no center subcarrier).

When the access point 300 includes a plurality of antennas (a plurality of antenna elements constituting an antenna 306), the "space" (layer) is also usable as one of wireless resources, using a technique such as beam forming and MIMO. The "space" that is one of wireless resources may be allocated to either one user (wireless terminal 120) or a plurality of users (wireless terminals 120), using the SU-MIMO (Single User MIMO) technique, within the range defined by the number of reception antennas of the wireless terminal 120.

In the example illustrated in FIG. 10, in a first subframe (length: 1 ms), user 1 (wireless terminal 120-1) is allocated with two layers (layers 1 and 2). Similarly, in the first subframe, user 2 (wireless terminal 120-2) is allocated with two layers (layers 1 and 2). In the first subframe, user 3 (wireless terminal 120-3) is allocated with one layer (layer 3). In the first subframe, user 4 (wireless terminal 120-4) is allocated with one layer (layer 4). In the first subframe, user 5 (wireless terminal 120-5) is allocated with two layers (layers 3 and 4).

Although layer 1 (and layer 2) is allocated to both users 1 and 2, users 1 and 2 are allocated with different frequencies (different subcarriers) to separate wireless resources to be allocated between users 1 and 2. Similarly, although layer 3 is allocated to both users 3 and 5, users 3 and 5 are allocated with different frequencies (different subcarriers) to separate wireless resources to be allocated between users 3 and 5. The same applies to layer 4. Hence, the spatial multiplicity is 4.

Generally, each access point 300 has degrees of freedom of the "space" (layer) equal in number to antennas (the number of antenna elements constituting the antenna 306), and spatial multiplexing at this number of degrees of freedom or less can be performed. However, the spatial multiplexing order usable in practice varies depending on the strength of channel correlation with the reception antenna of each wireless terminal 120, the reception level and the noise/interference level in this wireless terminal 120, and the like.

Figure 13:
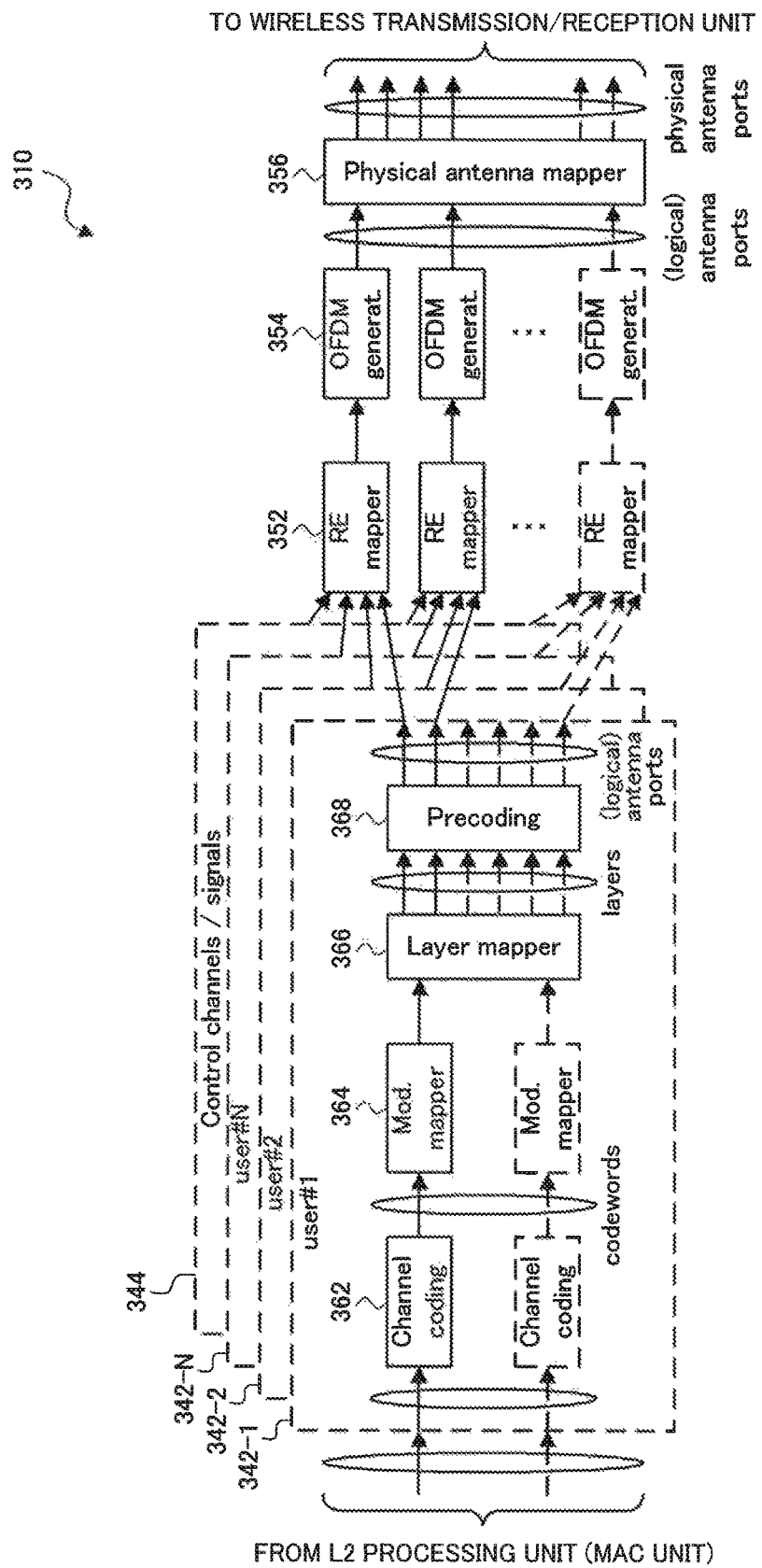
FIG. 13 is a diagram illustrating an exemplary specific configuration of a wireless signal processing unit according to the third exemplary embodiment.

FIG. 13 is a diagram illustrating an exemplary specific configuration of a wireless signal processing unit 310 according to the third exemplary embodiment. A wireless signal processing unit 410 (second exemplary embodiment) may have the same configuration. Although FIG. 13 illustrates downstream transmission processing of processing associated with the layer 1 protocol (physical layer), the wireless signal processing unit 310 may perform upstream reception processing using a corresponding configuration.

The wireless signal processing unit 310 includes user processing units 342-1 to 342-N (N: an integer of 1 or more), a control channel/signal processing unit 344, a resource element mapping unit 352, an OFDM symbol generation unit 354, and a physical antenna mapping unit 356, as illustrated in FIG. 13. The user processing units 342-1 to 342-N perform processing associated with a plurality of users (wireless terminals 120), respectively. In other words, the user processing units 342-1 to 342-N perform processing associated with users 1 to N (wireless terminals 120-1 to 120-N), respectively. The control channel/signal processing unit 344 performs processing associated with control channels and control signals common for each cell.

The resource element mapping unit 352 and the OFDM symbol generation unit 354 perform processing for collectively converting the processing result for each of a plurality of users and the processing results of control channels/signals into signals to be transmitted using each logical antenna port. The physical antenna mapping unit 356 performs processing for converting the signal for each logical antenna port into a signal to be transmitted via an actual physical antenna (antenna 306) and mapping it to each physical antenna. Details will be described below.

The user processing unit 342 and the control channel/signal processing unit 344 include a channel encoding unit 362, a modulation mapping unit 364, a layer mapping unit 366, and a precoding unit 368. The channel encoding unit 362 performs channel encoding for input data (MAC PDU; Transport Block) from the layer 2 processing function (general-purpose server 204; software 210). Examples of channel encoding include addition of a CRC (Cyclic Redundancy Check), error correction encoding, interleaving, and rate matching, but the present invention is not limited to these examples.

The modulation mapping unit 364 maps encoded data (codewords) encoded by the channel encoding unit 362 to signal points (constellation points) according to the modulation scheme. Thus, the modulation mapping unit 364 generates a modulation signal. Examples of the modulation scheme include BPSK (Binary Phase Shift Keying), QPSK (Quadrature Phase Shift Keying), 16-QAM (Quadrature Amplitude Modulation), and 64-QAM, but the present invention is not limited to these examples.

The layer mapping unit 366 maps modulation signals generated by the modulation mapping unit 364 to a plurality of layers (the "spaces (layers)" illustrated in FIG. 10). The "plurality of layers" are used when, for example, the information rate is improved by spatial multiplexing as in, for example, MIMO (Multi-Input Multi-Output), or the error rate is reduced by transmission using a plurality of antennas as in transmission diversity. The center node 200 (software 210) determines which layers are to be allocated to which users (wireless terminals 120). In other words, the layer mapping unit 366 performs mapping processing in accordance with an instruction (for example, a wireless resource instruction signal) sent from the center node 200. The precoding unit 368 precodes the modulation signals mapped to the plurality of layers and outputs a signal for each logical antenna port.

Resource element mapping units 352 equal in number to logical antenna ports are provided. The resource element mapping unit 352 maps to the RE (Resource Element), the logical antenna port outputs of the user processing units 342 associated with a plurality of users and the logical antenna port output of the control channel/signal processing unit 344, obtained using the same logical antenna port. The resource element (RE) uses one subcarrier (frequency) and one symbol (time) as one unit.

The resource element (RE) is defined using the subcarrier illustrated in FIG. 12 as one unit in the frequency direction and the symbol illustrated in FIG. 11 as one unit in the time direction. The resource elements are allocated to each user (wireless terminal 120) and control channels/signals. The resource element mapping unit 352 maps to each allocated resource element, the logical antenna port output of the user processing unit 342 associated with each corresponding user (wireless terminal 120) and the logical antenna port output of the control channel/signal processing unit 344. In other words, the resource element mapping unit 352 performs resource element mapping processing for each logical antenna port.

"0" is mapped to an unallocated (unused) resource element (RE). Generally, when the same resource element (RE) is used for a plurality of users (wireless terminals 120) and control channels/signals (that is, spatial multiplexing is performed), different logical antenna ports are used. In other words, the same resource element (RE) is not shared between a plurality of users (wireless terminals 120) and control channels/signals, for one logical antenna port. Each resource element mapping unit 352 illustrated in FIG. 13 does not map the same resource element to a plurality of users (wireless terminals 120) and control channels/signals.

The output of the resource element mapping unit 352 represents a subcarrier, that is, a digital baseband waveform of a frequency region. The OFDM symbol generation unit 354 uses IFFT (Inverse Fast Fourier Transform) or a circuit configuration equivalent to it to convert a digital baseband waveform of a frequency region into a digital baseband waveform of a time region. The OFDM symbol generation unit 354 then adds a cyclic prefix (CP) and outputs a continuous time waveform. OFDM symbol generation units 354 equal in number to logical antenna ports are provided.

The physical antenna mapping unit 356 associates logical antenna ports with physical antenna elements (antenna 306). This association is closely related to antenna directivity control and spatial multiplexing. Assume, for example, that the number of antenna elements constituting the antenna 306 of the access point 300 is 128, and the number of reception antennas of the wireless terminal 120 is 2. Then, since spatial multiplexing can be performed up to a maximum of 2×2 MIMO for each user (wireless terminal 120), one or two logical antenna ports are provided for each user.

The physical antenna mapping unit 356 multiplies the signal from each logical antenna port by an antenna weighting factor, sums the obtained signals, and outputs the result from each physical antenna (each antenna element constituting the antenna 306). When the antenna port is different between users (wireless terminals 120), the physical antenna mapping unit 356 selects an antenna weighting factor to adjust the directivity to a user (wireless terminal 120) targeted for transmission. An antenna beam is thus formed for each user (wireless terminal 120). As in antenna ports to which control channels/signals are transmitted, for antenna ports to which signals need to be transmitted in all directions within the cell, the physical antenna mapping unit 356 selects an antenna weighting factor which forms a directivity wide enough to cover the entire cell. The same applies to antenna ports intended for users (wireless terminals 120) that are not to undergo beam forming. In this case, the users (wireless terminals 120) may be identified using different resource elements (REs).

The wireless transmission/reception unit 304 converts the output of the physical antenna mapping unit 356 into a wireless signal for each physical antenna (physical antenna port). The wireless transmission/reception unit 304 amplifies and filters the signal as appropriate, and the like. The wireless transmission/reception unit 304 transmits a wireless signal from each antenna element constituting the antenna 306.

Since upstream reception processing is symmetrical about transmission processing, a detailed description thereof will not be given. Reception signals are influenced by, for example, wireless channel variations such as noise, interference, and fading and are more likely to be erroneously received. Therefore, to reduce the reception error rate of upstream data, a plurality of access points 300 receive the same data and the center node 200 (software 210) performs processing for selecting and synthesizing reception data received by the plurality of access points 300. When the output of a channel decoding unit 326 of each access point 300 is hard decision output, correct data is selected by a CRC in the selection and synthesis processing at the center node 200. When the output of the channel decoding unit 326 of each access point 300 is soft decision output, decoding results obtained by the plurality of access points 300 are synthesized to perform final determination in the selection and synthesis processing at the center node 200. Thus, even when CRCs at all access points 300 are wrong, correct reception data may be obtained.

Figure 14:
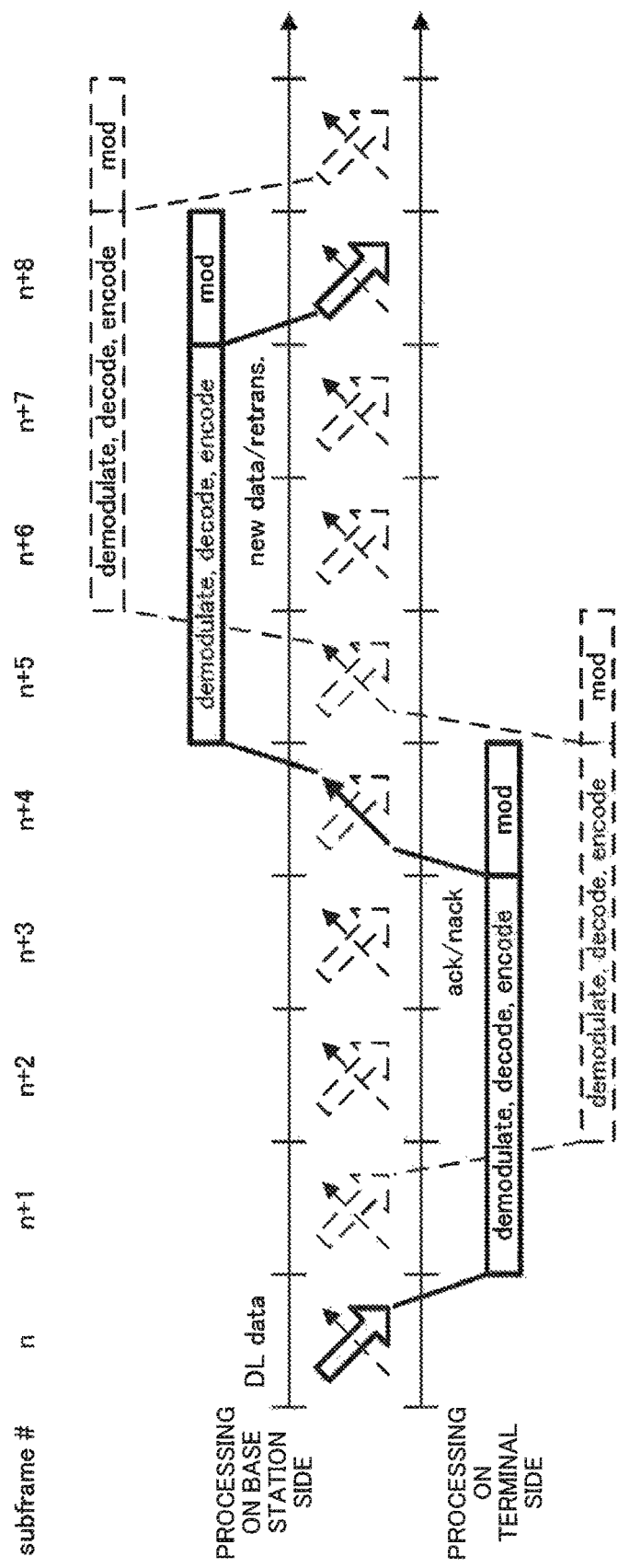
FIG. 14 is a diagram for explaining the downstream HARQ timing.

The downstream HARQ timing will be described hereinafter. FIG. 14 is a diagram for explaining the downstream HARQ timing. In FDD of LTE, an eighth-order stop and wait HARQ scheme is employed, as described above. When retransmission or new data transmission is determined at an interval of eight subframes, downstream transmission directed to the same wireless terminal 120 can be continuously performed to attain a peak rate needed by the wireless terminal 120. As illustrated in FIG. 14, the wireless terminal 120 needs to send an ACK/NACK response to the base station side (center node 200 and access point 300) four subframes after downstream reception. On the other hand, the base station side (center node 200 and access point 300) can transmit retransmission data four subframes after NACK reception. Note, however, that on the base station side, the data in question is not necessarily determined to be retransmitted exactly after four subframes and may be freely scheduled to be retransmitted later than four subframes. For example, the base station side may allocate wireless resources to other wireless terminals 120 to maintain fairness to the other wireless terminals 120, or scheduling may be performed later than four subframes when the processing time on the base station side is missed.

Referring to FIG. 14, on the base station side (access point 300 and center node 200), the access point 300 performs upstream data demodulation processing and channel decoding processing including ACK/NACK. The center node 200 performs scheduling processing of a final method for using wireless resources, including determination as to whether retransmission or new data transmission is to be performed. The access point 300 performs encoding processing and modulation processing, converts data into a wireless signal, and transmits it, in accordance with the finally determined transmission data (retransmission/new data) and method for using wireless resources.

In LTE, since the frame format illustrated in FIG. 11 is employed, encoding processing needs to be performed on data having the subframe length and ended before the start of modulation processing on OFDM symbols including relevant data. Modulation processing needs to be performed on data having the OFDM symbol length and ended before the start of physical antenna mapping processing of IQ samples including relevant data. The physical antenna mapping processing is processing for each IQ sample, which needs to be ended before a relevant IQ sample is output to the wireless transmission/reception unit 304. In this manner, in LTE, in response to the need to shorten the delay, the delay can be reduced, as described above, in the present exemplary embodiment so that the above-mentioned HARQ processing can be performed at an appropriate timing.

(Fourth Exemplary Embodiment)

Figure 15:
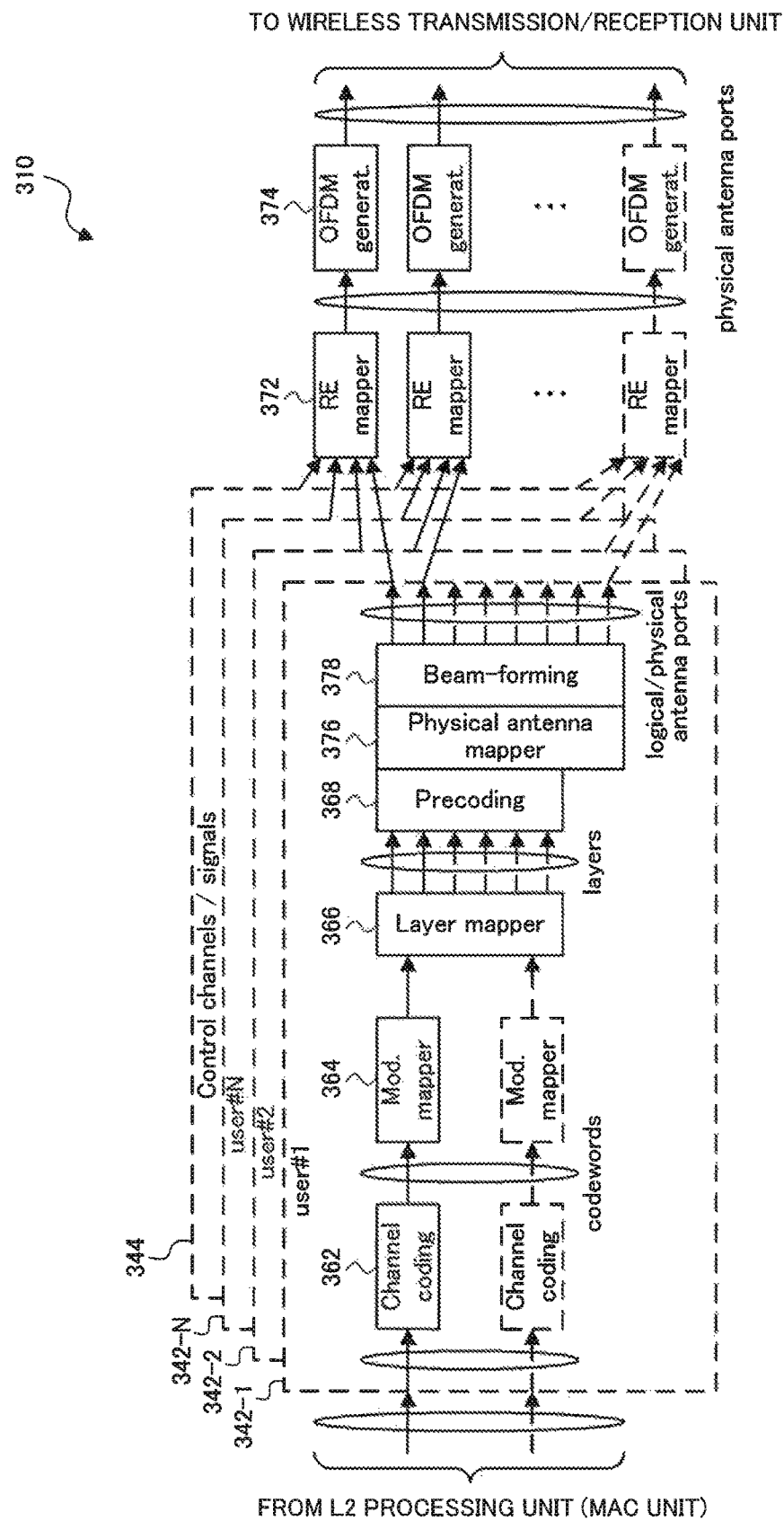
FIG. 15 is a diagram illustrating an exemplary specific configuration of a wireless signal processing unit according to a fourth exemplary embodiment.

FIG. 15 is a diagram illustrating an exemplary specific configuration of a wireless signal processing unit 310 according to a fourth exemplary embodiment. A wireless signal processing unit 410 (second exemplary embodiment) may have the same configuration. Although FIG. 15 illustrates downstream transmission processing of processing associated with the layer 1 protocol (physical layer), the wireless signal processing unit 310 may perform upstream reception processing using a corresponding configuration, as in FIG. 13.

The wireless signal processing unit 310 includes user processing units 342-1 to 342-N, a control channel/signal processing unit 344, a resource element mapping unit 372, and an OFDM symbol generation unit 374, as illustrated in FIG. 15. The user processing unit 342 and the control channel/signal processing unit 344 include a channel encoding unit 362, a modulation mapping unit 364, a layer mapping unit 366, a precoding unit 368, a physical antenna mapping unit 376, and a beam forming unit 378.

The physical antenna mapping unit 376 maps signals precoded by the precoding unit 368 to physical antennas (antenna elements constituting an antenna 306) by the same processing as in the physical antenna mapping unit 356. The beam forming unit 378 performs processing associated with beam forming, on the signals mapped to the physical antennas. The precoding unit 368, the physical antenna mapping unit 376, and the beam forming unit 378 are integrated by, for example, their implementation in a common circuit. In other words, precoding processing, processing for mapping to physical antennas, and beam forming processing are collectively performed.

The difference between the fourth exemplary embodiment and the third exemplary embodiment (FIG. 13) lies in that in the former, precoding and beam forming are collectively performed for each physical antenna port without going through a logical antenna port. Both precoding and beam forming are processing for multiplication by an antenna-specific weighting factor. Therefore, precoding and beam forming can be implemented in a common circuit. In other words, since a signal output from the layer mapping unit 366 is a signal of a frequency region, it is also possible to regard this processing as multiplication by a beam forming coefficient in the frequency region.

Resource element mapping units 372 equal in number to physical antenna ports are provided. The resource element mapping unit 372 performs the same processing as in the resource element mapping unit 352 to map to the resource element (RE), the physical antenna port outputs of the user processing units 342 associated with a plurality of users and the physical antenna port output of the control channel/signal processing unit 344, obtained using the same physical antenna port.

The output of the resource element mapping unit 372 represents a subcarrier, that is, a digital baseband waveform of a frequency region. The OFDM symbol generation unit 374 uses IFFT (or a circuit equivalent to it) to convert a digital baseband waveform of a frequency region into a digital baseband waveform of a time region. The OFDM symbol generation unit 374 then adds a cyclic prefix (CP) and outputs a continuous time waveform. OFDM symbol generation units 374 equal in number to physical antenna ports are provided.

The numbers of resource element mapping units 352 and OFDM symbol generation units 354 according to the third exemplary embodiment are equal to the number of logical antenna ports, as described above. The numbers of resource element mapping units 372 and OFDM symbol generation units 374 according to the fourth exemplary embodiment are equal to the number of physical antenna ports. Therefore, when the number of logical antenna ports is larger than the number of physical antenna ports, the required numbers of resource element mapping units and OFDM symbol generation units can be made smaller in the fourth exemplary embodiment than in the third exemplary embodiment. When spatial multiplexing is performed for a plurality of users (wireless terminals 120) by beam forming or MU-MIMO, this condition is often satisfied because respective users are mapped to different (logical) antenna ports.

(Other Exemplary Embodiments)

The following exemplary embodiments provide examples different from the above-described exemplary embodiments in terms of function sharing of layer 2 processing and layer 1 processing between a center node 200 and an access point 300. Wireless resource management functions (for example, a wireless resource management unit 218 and a wireless resource allocation unit 220) and functions (for example, a radio channel quality management unit 214 and an access point selection unit 216) for selecting an access point 300 to perform transmission and reception to and from a wireless terminal 120 are always located at the center node 200. A wireless transmission/reception unit 304 (and a wireless transmission/reception unit 504) and an antenna 306 (and an antenna 506) are always located at the access point 300 (and the second access point 500). Accordingly, a description of these components will be omitted in the following exemplary embodiments as appropriate. A description of a wireless resource instruction signal transmitted from the center node 200 to the access point 300 (second access point 500) will also be omitted as appropriate.

(Fifth Exemplary Embodiment)

Figure 16:
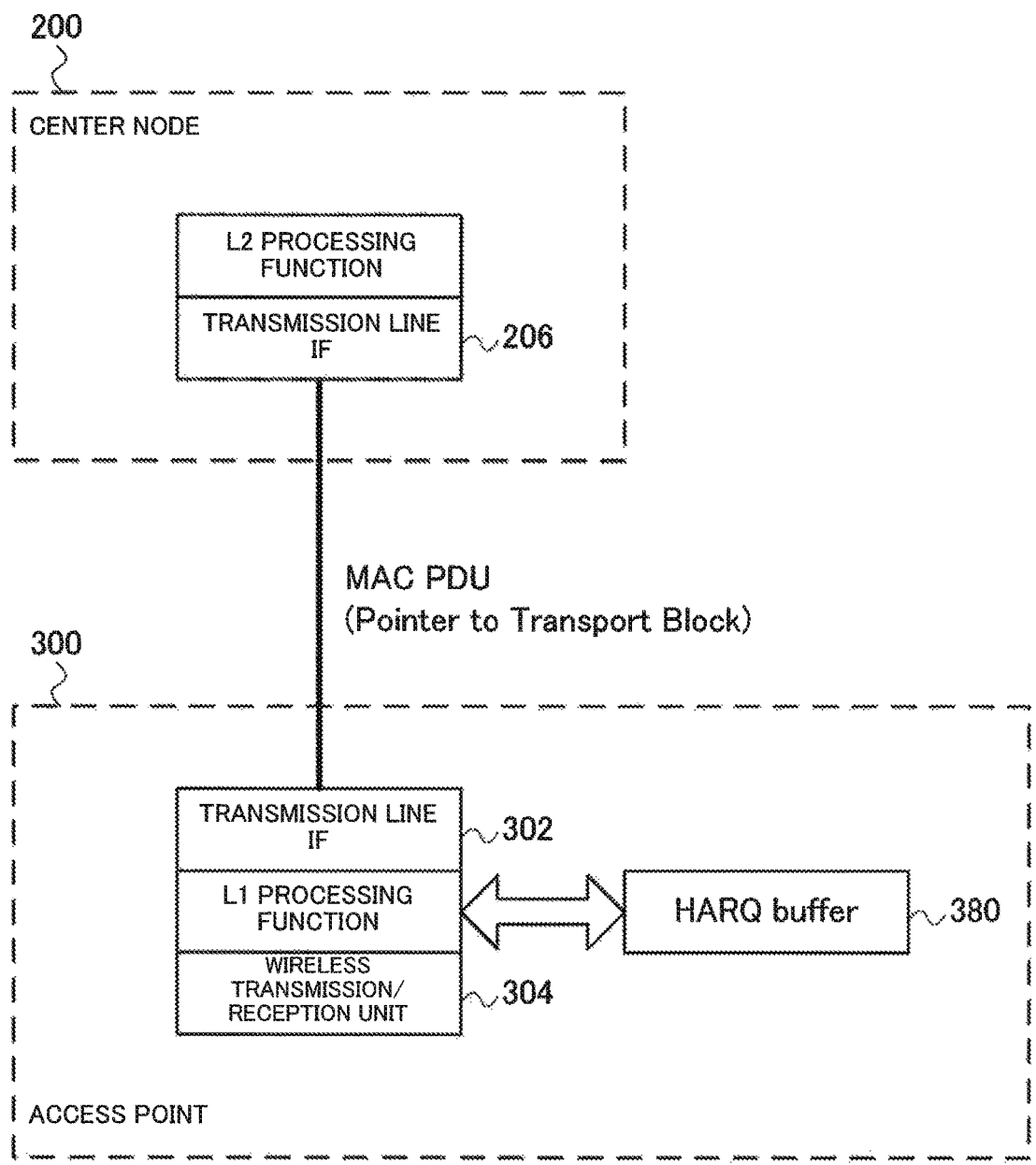
FIG. 16 is a diagram illustrating how protocol processing functions are shared between a center node and an access point according to a fifth exemplary embodiment.

FIG. 16 is a diagram illustrating how protocol processing functions are shared between a center node 200 and an access point 300 according to a fifth exemplary embodiment. In the fifth exemplary embodiment, an HARQ buffer 380 is located at the access point 300, as illustrated in FIG. 16. The HARQ buffer 380 stores transmission data (Transport Block) transmitted from the center node 200. With such a configuration, when retransmission is required in the HARQ, the center node 200 need only transmit a pointer indicating which data (Transport Block) is to be retransmitted. Upon receiving the pointer from the center node 200, the access point 300 can retransmit the data indicated by the pointer of the transmission data stored in the HARQ buffer 380. Therefore, when retransmission is required in the HARQ, it is unnecessary to transmit retransmission data from the center node 200 to the access point 300 again.

(Sixth Exemplary Embodiment)

Figure 17:
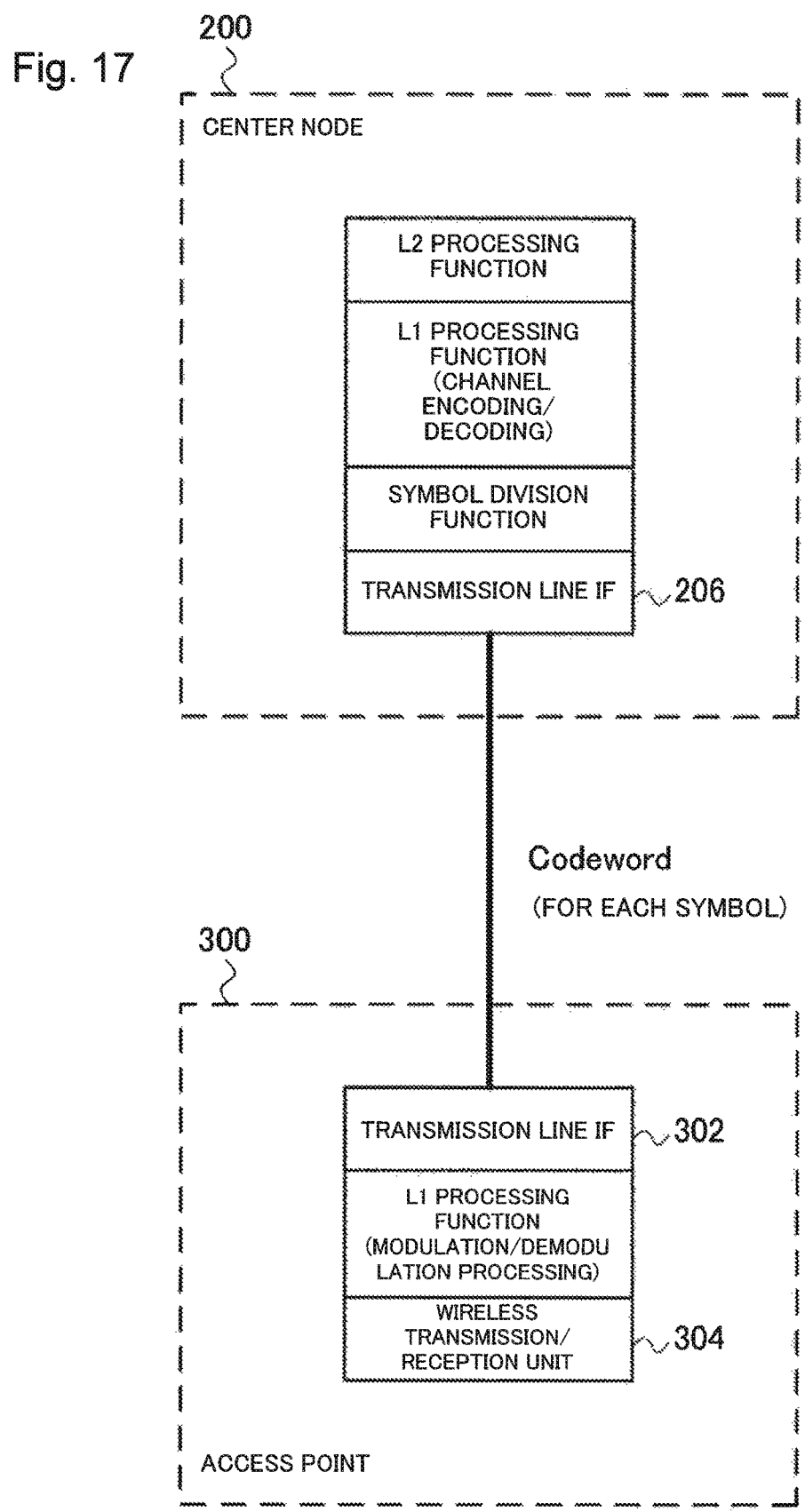
FIG. 17 is a diagram illustrating how protocol processing functions are shared between a center node and an access point according to a sixth exemplary embodiment.

FIG. 17 is a diagram illustrating how protocol processing functions are shared between a center node 200 and an access point 300 according to a sixth exemplary embodiment. As illustrated in FIG. 17, in the sixth exemplary embodiment, not only an L2 processing function but also a channel encoding processing function/channel decoding processing function of an L1 processing function and a symbol division function are located at the center node 200. A modulation/demodulation processing function of the L1 processing function is located at the access point 300.

The center node 200 uses the channel encoding processing function to perform channel encoding of transmission data (downstream data) for all channels (all users) corresponding to one subframe. The center node 200 then uses the symbol division function to divide all encoded data (Codewords) for each symbol that is the unit of modulation processing. The center node 200 sequentially transmits the encoded data divided for each symbol to the access point 300 to complete transmission of all necessary data before the start of modulation processing of each symbol. The access point 300 performs modulation processing, precoding/beam forming, and OFDM symbol generation processing for each symbol, on the encoded data received from the center node 200.

Compared to transmission of MAC_PDU for each subframe, encoded data divided for each symbol can be transmitted with a smaller unit. In the sixth exemplary embodiment, therefore, the time taken for data transmission of one unit can be shortened. The time to wait until the completion of transmission at the access point 300 can, in turn, be shortened to enhance the operation ratio of the circuit that executes the L1 processing function.

Although function division may be similarly performed for upstream reception data processing, the effect is different from that in the above-mentioned case of downstream transmission. In upstream reception, the output of demodulation processing represents likelihood information including the reliability of data discrimination and is represented by a plurality of bits (for example, six bits) for 1-bit transmission data. The upstream transmission rate rises. On the other hand, the center node 200 can perform channel decoding processing (especially error correction processing) by synthesizing signals received by a plurality of access points 300 by weighted summation. The reception characteristics can thus be improved.

As described above, applying the configuration according to the sixth exemplary embodiment to upstream reception data processing has not only disadvantages but also advantages. Therefore, the functional arrangement of upstream reception processing need not be identical to that of downstream transmission processing. For example, functions may be shared such that channel encoding processing is located at the center node 200 for downstream transmission processing, as in the sixth exemplary embodiment, while channel decoding processing is located at the access point 300 for upstream reception processing, as in, for example, the first exemplary embodiment.

(Seventh Exemplary Embodiment)

Figure 18:
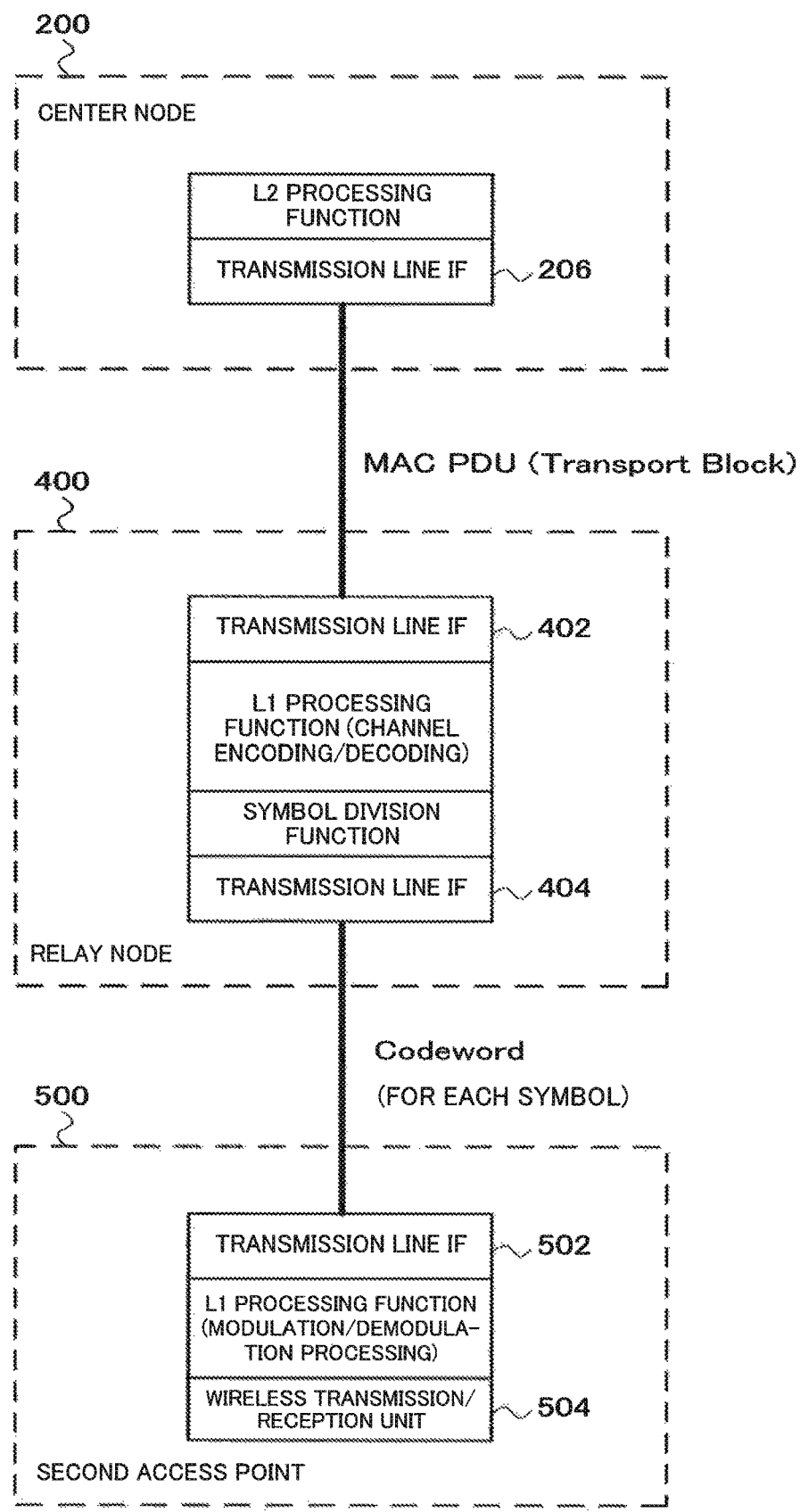
FIG. 18 is a diagram illustrating how protocol processing functions are shared among a center node, a relay node, and a second access point according to a seventh exemplary embodiment.

FIG. 18 is a diagram illustrating how protocol processing functions are shared among a center node 200, a relay node 400, and a second access point 500 according to a seventh exemplary embodiment. As illustrated in FIG. 18, in the seventh exemplary embodiment, an L2 processing function is located at the center node 200, as in, for example, the second exemplary embodiment. A channel encoding processing function/channel decoding processing function of an L1 processing function and a symbol division function are located at the relay node 400. A modulation/demodulation processing function of the L1 processing function is located at the second access point 500.

MAC_PDU is transmitted between the center node 200 and the relay node 400, as in, for example, the second exemplary embodiment. Channel-encoded data (downstream transmission data) divided for each symbol is transmitted between the relay node 400 and the second access point 500, as in transmission between the center node 200 and the access point 300 in the sixth exemplary embodiment. Like the access point 300 according to the sixth exemplary embodiment, the second access point 500 performs modulation processing, precoding/beam forming, and OFDM symbol generation processing for each symbol, on the encoded data received from the relay node 400.

As in the sixth exemplary embodiment, in the seventh exemplary embodiment, the same function sharing need not be performed in downstream transmission processing and upstream reception processing. In the seventh exemplary embodiment, as in, for example, the first exemplary embodiment, since the center node 200 includes no wireless signal processing function, processing in a general-purpose server 204 is not complicated and can be easily implemented by, for example, a general-purpose processor. In addition, since the unit of data transmission between the relay node 400 and the second access point 500 is small (because it is the symbol unit), the time to wait in data transmission can be shortened.

(Eighth Exemplary Embodiment)

Figure 19:
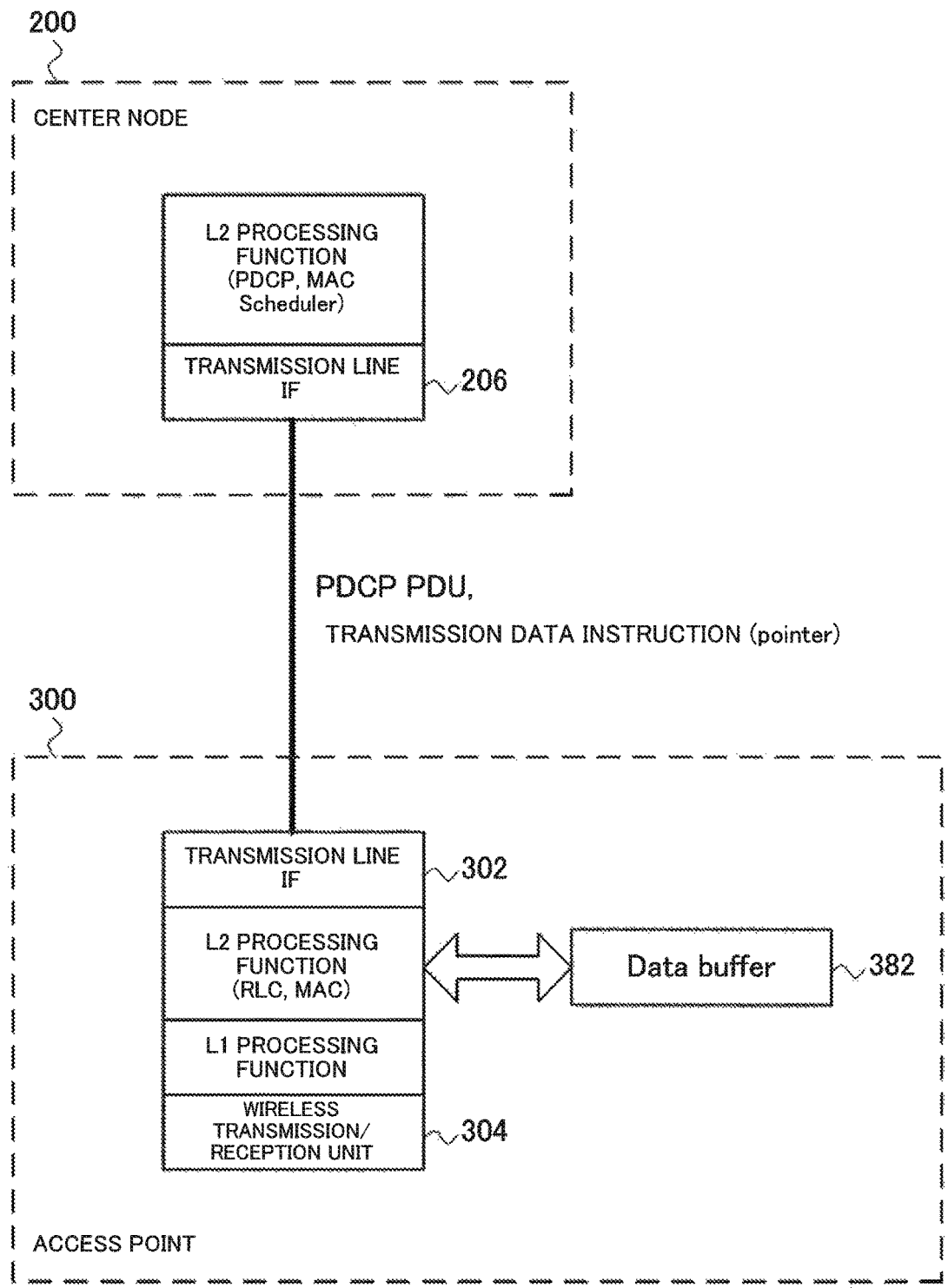
FIG. 19 is a diagram illustrating how protocol processing functions are shared between a center node and an access point according to an eighth exemplary embodiment.

FIG. 19 is a diagram illustrating how protocol processing functions are shared between a center node 200 and an access point 300 according to an eighth exemplary embodiment. As illustrated in FIG. 19, in the eighth exemplary embodiment, a PDCP processing function and MAC scheduling function of an L2 processing function are located at the center node 200.

An RLC processing function and MAC packet decomposition/composition function of the L2 processing function, and an L1 processing function are located at the access point 300. In the eighth exemplary embodiment, a data buffer 382 is further located at the access point 300.

Upon performing PDCP processing by the PDCP processing function, the center node 200 transmits PDCP_PDU (transmission data main body) to the access point 300 before performing scheduling (at least before the end of scheduling). The access point 300 stores PDCP_PDU transmitted from the center node 200 in the data buffer 382.

The center node 200 performs scheduling processing in parallel with PDCP_PDU transmission. The center node 200 sends a scheduling result instruction signal to the access point 300. The scheduling result instruction signal represents a scheduling result indicating which data are transmitted to which users (wireless terminals 120) (for example, to which user a specific subframe is to be transmitted, whether retransmission or new data transmission is to be performed, and the data size at this time). The scheduling result signal includes, for example, a pointer and a data size.

Note that the pointer indicates the start position of data corresponding to a subframe to be transmitted to a user (wireless terminal 120) targeted for transmission in the transmission data main body (PDCP_PDU) stored in the data buffer 382. In other words, the scheduling result instruction signal represents data for identifying a user (wireless terminal 120) targeted for transmission in the subframe, and the start position (pointer) of data targeted for transmission and the size of the data. The center node 200 sends a wireless resource instruction signal to the access point 300, as in, for example, the first exemplary embodiment.

The access point 300 composes RLC_PDU and MAC_PDU in accordance with a scheduling result instruction signal for a corresponding subframe, using the data (transmission data main body; PDCP_PDU) received and stored in the data buffer 382 in advance. The access point 300 performs channel encoding processing, modulation processing, and precoding/beam forming processing in accordance with the wireless resource instruction signal. The access point 300 converts a generated baseband signal into a wireless signal and transmits the wireless signal to the wireless terminal 120 targeted for transmission via an antenna 306.

After data (MAC_PDU) to be actually transmitted in each subframe is determined, the center node 200 starts to transmit the data to the access point 300. In this case, when data having a large unit is transmitted, the time from the start of data transmission until the completion of data transmission is prolonged. During the time to wait until the data transmission is completed, the access point 300 cannot start the next processing. Generally, in a specific subframe, which user (wireless terminal 120) is set as a target for transmission, whether the data to be transmitted will be retransmitted or transmitted as new data, the data size at this time, and the like, are finally determined only after scheduling is completed.

In the eighth exemplary embodiment, the transmission data itself is stored in the data buffer 382 of the access point 300 in advance. Accordingly, at the time of the completion of scheduling, the center node 200 need not transmit the transmission data main body to the access point 300. In other words, the center node 200 need only indicate to the access point 300, data for identifying a user targeted for transmission in the subframe, and the data start position/size. In this manner, transmitting the transmission data main body to the access point 300 in advance allows considerable shortening of the time to wait in data transmission. This is because the size of data (scheduling result instruction signal) required to indicate data representing a user targeted for transmission and the data start position/size is smaller than that of the transmission data main body. Setting the priority of transmission of a transmit instruction (scheduling result instruction signal) higher than that of transmission of the transmission data main body prevents the transmission instruction (scheduling result instruction signal) from interrupting the transmission data main body transmitted in advance.

In the above-described eighth exemplary embodiment, as a method for indicating transmission data, a scheduling result instruction signal indicating the user identifier of a target for transmission and the start position/size of transmission data is used, but the present invention is not limited to this. For example, the present invention is not limited to the above-mentioned method as long as the method used can indicate data actually transmitted from the data stored in the data buffer 382 of the access point 300 in advance.

Function sharing of downstream transmission processing and function sharing of upstream reception processing are the same in FIG. 19, but they may be different from each other. In other words, an upstream signal whose wait time needs to be shortened is a signal indicating an ACK/NACK response to downstream data and whether upstream data have been successfully received (CRC check result). The data size of the signal indicating an ACK/NACK response and a CRC check result is relatively small. Setting the priority of transmission for these data to be high achieves a sufficiently short time to wait for transmission completion. Therefore, functions may be shared differently between downstream transmission processing and upstream reception processing such that an L2 reception processing function is located at the center node 200 and an L1 reception processing function is located at the access point 300, for upstream reception processing, as in, for example, the first exemplary embodiment.

(Ninth Exemplary Embodiment)

Figure 20:
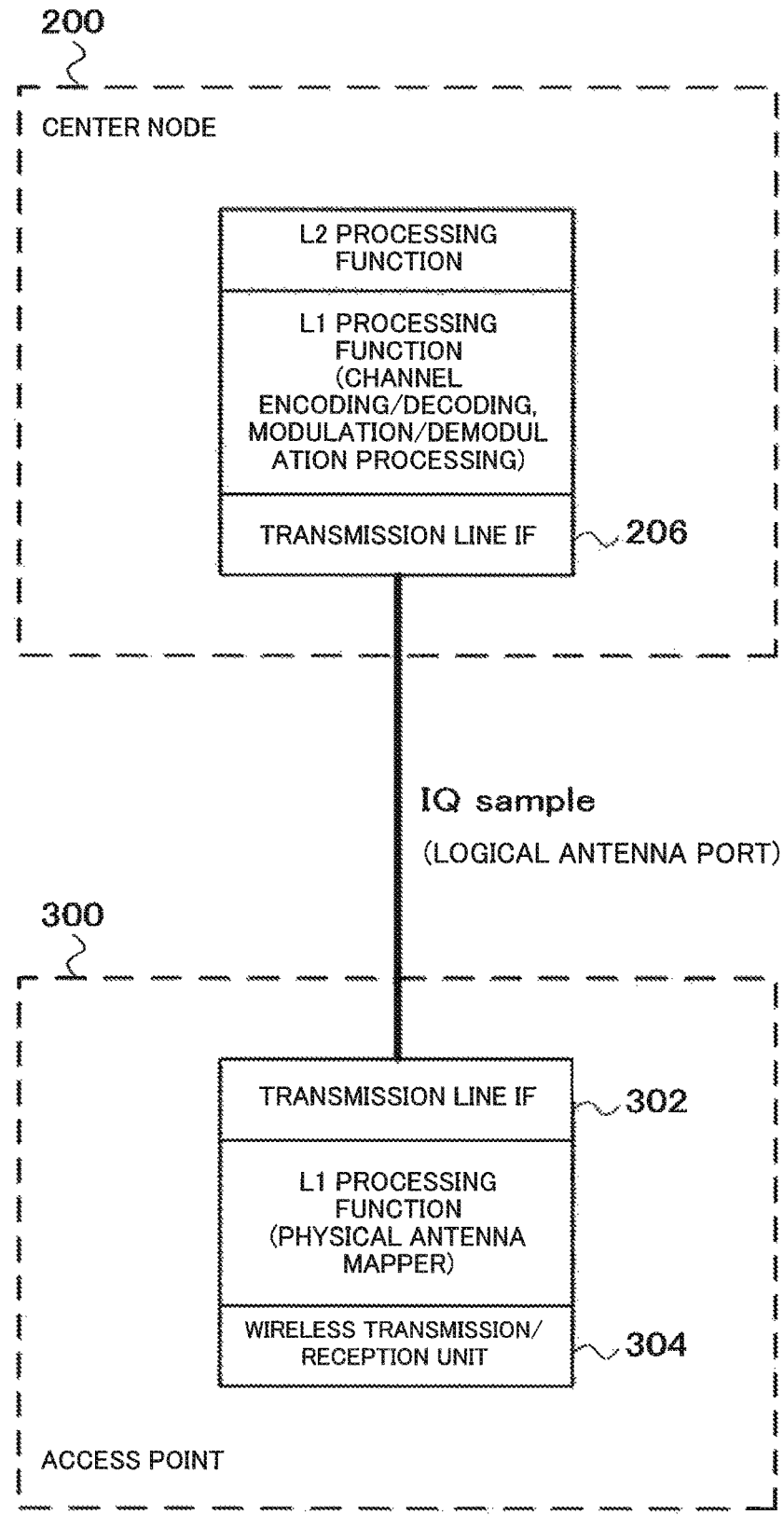
FIG. 20 is a diagram illustrating how protocol processing functions are shared between a center node and an access point according to a ninth exemplary embodiment.

FIG. 20 is a diagram illustrating how protocol processing functions are shared between a center node 200 and an access point 300 according to a ninth exemplary embodiment. As illustrated in FIG. 20, in the ninth exemplary embodiment, an L2 processing function, and a channel encoding function/channel decoding function and modulation/demodulation function of an L1 processing function are located at the center node 200. A physical antenna mapping function of the L1 processing function is located at the access point 300. The physical antenna mapping function is the function of mapping logical antenna ports to physical antenna ports. The physical antenna mapping function is the same as the function of the physical antenna mapping unit 356, described with reference to FIG. 13 in the third exemplary embodiment, and performs weighted summation processing for each antenna. The effective amount of information corresponding to logical antenna ports is smaller than that corresponding to physical antennas. Therefore, compared to CPRI transmission according to the above-mentioned related-art technique, the amount of information in the transmission line between the center node 200 and the access point 300 can be reduced.

Although functions are shared between the center node 200 and the access point 300 in FIG. 20, the present invention is not limited to this. Functions may be assigned to a relay node 400, as in the second or seventh exemplary embodiment. In this case, only an L2 processing function may be located at the center node 200, and a channel encoding function and modulation/demodulation function of an L1 processing function may be located at the relay node 400.

(Modification)

The present invention is not limited to the above-described exemplary embodiments and may be changed as appropriate without departing from the spirit of the present invention. The configuration of each exemplary embodiment is applicable to other exemplary embodiments. For example, the configuration of the second exemplary embodiment is also applicable to the third exemplary embodiment.

In addition, although the present invention has been described as hardware configuration in the above-described exemplary embodiments, the present invention is not limited to this. In the present invention, the processing of each circuit in each device constituting the wireless communication system can also be implemented by causing a CPU (Central Processing Unit) to execute a computer program.

In the above-mentioned example, the program is stored using a variety of non-transitory computer readable media and can be supplied to the computer. The non-transitory computer readable media include a variety of tangible storage media. Examples of the non-transitory computer readable media include magnetic recording media (for example, a flexible disk, a magnetic tape, and a hard disk drive), magnetooptical recording media (for example, a magnetooptical disk), a CD-ROM (Read Only Memory), a CD-R, a CD-R/W, and semiconductor memories (for example, a mask ROM, a PROM (Programmable ROM), an EPROM (Erasable PROM), a flash ROM, and a RAM (Random Access Memory)). The program may be supplied to the computer using a variety of transitory computer readable media. Examples of the transitory computer readable media include electrical signals, optical signals, and electromagnetic waves. The transitory computer readable media can supply the program to the computer via wired communication paths such as electrical wires and optical fibers or wireless communication paths.

A part or all of the above-described exemplary embodiments may be described as in the following supplementary notes, but they are not limited thereto.

(Supplementary Note 1)

A wireless communication system comprising:

a wireless control device; and at least one wireless device which is connected to the wireless control device via a transmission line and wirelessly communicates with a wireless terminal, wherein the wireless control device includes:

wireless resource allocation means for allocating a wireless resource used by the wireless device in wirelessly communicating with the wireless terminal; and wireless resource instruction means for sending an instruction for allowing use of the allocated wireless resource to the wireless device, and the wireless device includes:

wireless signal processing means for executing processing to perform wireless communication using the allocated wireless resource, on data to be sent to the wireless terminal, on the basis of the instruction from the wireless control device; and wireless transmission means for converting a signal processed by the wireless signal processing means into a wireless signal and transmitting the wireless signal to the wireless terminal.

(Supplementary Note 2)

The wireless communication system according to supplementary note 1, wherein the wireless device includes a plurality of wireless devices, the wireless control device further includes wireless device selection means for selecting the wireless device to wirelessly communicate with the wireless terminal, and the selected wireless device wirelessly communicates with the wireless terminal.

(Supplementary Note 3)

The wireless communication system according to supplementary note 2, wherein the wireless control device further includes wireless device control means for controlling the plurality of wireless devices to perform a cooperative operation, and the plurality of wireless devices performs a cooperative operation under the control of the wireless device control means.

(Supplementary Note 4)

The wireless communication system according to any one of supplementary notes 1 to 3, wherein the wireless device includes a plurality of antennas, and the wireless signal processing means performs antenna weighting processing for each of the plurality of antennas.

(Supplementary Note 5)

The wireless communication system according to any one of supplementary notes 1 to 4, wherein the wireless signal processing means performs channel encoding processing and channel decoding processing, and modulation processing and demodulation processing.

(Supplementary Note 6)

The wireless communication system according to any one of supplementary notes 1 to 4, wherein the wireless control device performs channel encoding processing on transmission data, divides the transmission data having undergone the channel encoding processing, for each symbol that is a unit of modulation processing, and transmits the transmission data to the wireless device, and the wireless device performs modulation processing for each symbol, on the transmission data transmitted from the wireless control device.

(Supplementary Note 7)

The wireless communication system according to any one of supplementary notes 1 to 4, wherein the wireless control device transmits the transmission data to the wireless device before end of scheduling processing, and sends a scheduling result instruction signal indicating a scheduling result to the wireless device after the end of the scheduling processing, and the wireless device stores the transmission data transmitted from the wireless control device, and transmits to the wireless terminal, a wireless signal representing data to be sent to the wireless terminal of the stored transmission data, on the basis of the scheduling result instruction signal.

(Supplementary Note 8)

A wireless communication system comprising:

a wireless control device;

at least one wireless device which wirelessly communicates with a wireless terminal; and a relay device which is interposed between the wireless control device and the wireless device, connected to the wireless control device via a first transmission line, and connected to the wireless device via a second transmission line, wherein the wireless control device includes:

wireless resource allocation means for allocating a wireless resource used by the wireless device in wirelessly communicating with the wireless terminal; and wireless resource instruction means for sending an instruction for allowing use of the allocated wireless resource to the relay device, wherein the relay device executes processing to perform wireless communication using the allocated wireless resource, on data to be sent to the wireless terminal, on the basis of the instruction from the wireless control device, and the wireless device converts a signal processed by the wireless signal processing means into a wireless signal and transmits the wireless signal to the wireless terminal.

(Supplementary Note 9)

The wireless communication system according to supplementary note 8, wherein the relay device performs channel encoding processing and channel decoding processing, and modulation processing and demodulation processing.

(Supplementary Note 10)

The wireless communication system according to supplementary note 8, wherein the relay device performs channel encoding processing on transmission data, divides the transmission data having undergone the channel encoding processing, for each symbol that is a unit of modulation processing, and transmits the transmission data to the wireless device, and the wireless device performs modulation processing for each symbol, on the transmission data transmitted from the wireless control device.

(Supplementary Note 11)

A wireless communication method for a wireless communication system comprising: a wireless control device; and at least one wireless device which is connected to the wireless control device via a transmission line and wirelessly communicates with a wireless terminal, the method comprising:

in the wireless control device, allocating a wireless resource used by the wireless device in wirelessly communicating with the wireless terminal; and sending an instruction for allowing use of the allocated wireless resource to the wireless device, and in the wireless device, executing processing to perform wireless communication using the allocated wireless resource, on data to be sent to the wireless terminal, on the basis of the instruction from the wireless control device; and converting a signal processed by the wireless signal processing means into a wireless signal and transmitting the wireless signal to the wireless terminal.

(Supplementary Note 12)

A wireless control device connected via a transmission line to at least one wireless device which wirelessly communicates with a wireless terminal, the wireless control device comprising:

wireless resource allocation means for allocating a wireless resource used by the wireless device in wirelessly communicating with the wireless terminal; and wireless resource instruction means for sending an instruction for allowing use of the allocated wireless resource to the wireless device.

(Supplementary Note 13)

The wireless control device according to supplementary note 12, further comprising:

wireless device selection means for selecting the wireless device to wirelessly communicate with the wireless terminal from a plurality of the wireless devices.

(Supplementary Note 14)

The wireless control device according to supplementary note 13, further comprising:

wireless device control means for controlling the plurality of wireless devices to perform a cooperative operation.

(Supplementary Note 15)

A wireless device which wirelessly communicates with a wireless terminal and is connected to a wireless control device via a transmission line, the wireless device comprising:

wireless signal processing means for executing processing to perform wireless communication using a wireless resource used by the wireless device in wirelessly communicating with the wireless terminal, on data to be sent to the wireless terminal, on the basis of an instruction configured to allow use of the wireless resource and sent by the wireless control device; and wireless transmission means for converting a signal processed by the wireless signal processing means into a wireless signal and transmitting the wireless signal to the wireless terminal.

(Supplementary Note 16)

The wireless device according to supplementary note 15, further comprising:

a plurality of antennas, wherein the wireless signal processing means performs antenna weighting processing for each of the plurality of antennas.

(Supplementary Note 17)

A relay device being interposed between a wireless control device and at least one wireless device which wirelessly communicates with a wireless terminal, being connected to the wireless control device via a first transmission line and connected to the wireless device via a second transmission line, and configured to execute processing to perform wireless communication using a wireless resource used by the wireless device in wirelessly communicating with the wireless terminal, on data to be sent to the wireless terminal, on the basis of an instruction configured to allow use of the wireless resource and sent by the wireless control device.

(Supplementary Note 18)

A wireless communication method for a wireless control device connected via a transmission line to at least one wireless device which wirelessly communicates with a wireless terminal, the method comprising:

allocating a wireless resource used by the wireless device in wirelessly communicating with the wireless terminal; and sending an instruction for allowing use of the allocated wireless resource to the wireless device.

(Supplementary Note 19)

A wireless communication method for a wireless device which wirelessly communicates with a wireless terminal and is connected to a wireless control device via a transmission line, the method comprising:

executing processing to perform wireless communication using a wireless resource used by the wireless device in wirelessly communicating with the wireless terminal, on data to be sent to the wireless terminal, on the basis of an instruction configured to allow use of the wireless resource and sent by the wireless control device; and converting a processed signal into a wireless signal and transmitting the wireless signal to the wireless terminal.

(Supplementary Note 20)

A wireless communication method for a relay device interposed between a wireless control device and at least one wireless device which wirelessly communicates with a wireless terminal, the method comprising:

executing processing to perform wireless communication using a wireless resource used by the wireless device in wirelessly communicating with the wireless terminal, on data to be sent to the wireless terminal, on the basis of an instruction configured to allow use of the wireless resource and sent by the wireless control device.

Although the present invention has been described above with reference to the above-described exemplary embodiments, the present invention is not limited thereto. Various changes which would be understood by those skilled in the art may be made to the configurations and details of the present invention within the scope of the invention.

This application claims priority based on Japanese Patent Application No. 2014-134111 filed on Jun. 30, 2014, the disclosure of which is incorporated herein in its entirety.

REFERENCE SIGNS LIST 1 wireless communication system
10 transmission line
20 wireless control device
22 wireless resource allocation unit
24 wireless resource instruction unit
30 wireless device
32 wireless signal processing unit
34 wireless transmission unit
100 wireless communication system
102 backhaul
104 core network
110 transmission line
112 transmission line
120 wireless terminal
150 wireless communication system
200 center node
202 reference clock generation unit
204 general-purpose server
206 transmission line interface
210 software
212 synchronizing unit
214 radio channel quality management unit
216 access point selection unit
218 wireless resource management unit
220 wireless resource allocation unit
222 access point control unit
240 PDCP processing unit
250 RLC processing unit
260 MAC processing unit
300 access point
302 transmission line interface
304 wireless transmission/reception unit
306 antenna
310 wireless signal processing unit
312 channel encoding unit
314 modulation unit
316 physical antenna mapping unit
322 physical antenna synthesis unit
324 demodulation unit
326 channel decoding unit
342 user processing unit
344 control channel/signal processing unit
352 resource element mapping unit
354 OFDM symbol generation unit
356 physical antenna mapping unit
362 channel encoding unit
364 modulation mapping unit
366 layer mapping unit
368 precoding unit
372 resource element mapping unit
374 OFDM symbol generation unit
376 physical antenna mapping unit
378 beam forming unit
380 HARQ buffer
382 data buffer
400 relay node
402 transmission line interface
404 transmission line interface
410 wireless signal processing unit
500 second access point
502 transmission line interface
504 wireless transmission/reception unit
506 antenna

The invention claimed is:

1. A wireless communication system comprising:
a wireless control device; and
a plurality of wireless devices which are connected to the wireless control device via a transmission line and configured to wirelessly communicate with a wireless terminal,
wherein the wireless control device includes:
a wireless resource allocation unit configured to allocate a wireless resource used by the plurality of wireless devices in wirelessly communicating with the wireless terminal;
a wireless resource instruction unit configured to send an instruction for allowing use of the allocated wireless resource to the plurality of wireless devices;
a wireless device selection unit configured to select at least one wireless device from among the plurality of wireless devices to wirelessly communicate with the wireless terminal; and
a wireless device control unit configured to control the plurality of wireless devices to perform a cooperative operation,
wherein each of the plurality of wireless devices includes:
a wireless signal processing unit configured to execute processing to perform wireless communication using the allocated wireless resource, on data to be sent to the wireless terminal, based on the instruction from the wireless control device, and to perform channel encoding and channel decoding processing, and modulation processing and demodulation processing; and
a wireless transmission unit configured to convert a signal processed by the wireless signal processing unit into a wireless signal and transmit the wireless signal to the wireless terminal,
wherein the selected at least one wireless device is configured to wirelessly communicate with the wireless terminal, and
wherein the plurality of wireless devices are configured to perform the cooperative operation under the control of the wireless device control unit.

2. The wireless communication system according to claim 1,
wherein each of the plurality of wireless devices includes a plurality of antennas, and
wherein the wireless signal processing unit of each of the plurality of wireless devices is configured to perform antenna weighting processing for each of the plurality of antennas.

3. The wireless communication system according to claim 1, wherein the wireless control device is configured to:
- transmit the transmission data to each of the plurality of wireless devices before end of scheduling processing, and
- send a scheduling result instruction signal indicating a scheduling result to each of the plurality of wireless devices after the end of the scheduling processing, and wherein each of the plurality of wireless devices is configured to:
- store the transmission data transmitted from the wireless control device, and
- transmit to the wireless terminal, a wireless signal representing data to be sent to the wireless terminal of the stored transmission data, based on the scheduling result instruction signal.

4. A wireless communication system comprising:
a wireless control device;
at least one wireless device configured to wirelessly communicate with a wireless terminal; and
a relay device which is interposed between the wireless control device and the at least one wireless device, connected to the wireless control device via a first transmission line, and connected to the at least one wireless device via a second transmission line, wherein
the wireless control device includes:
- a wireless resource allocation unit configured to allocate a wireless resource used by the at least one wireless device in wirelessly communicating with the wireless terminal; and
- a wireless resource instruction unit configured to send an instruction for allowing use of the allocated wireless resource to the relay device, wherein the relay device is configured to execute processing to perform wireless communication using the allocated wireless resource, on data to be sent to the wireless terminal, based on the instruction from the wireless control device,
wherein the relay device is configured to perform channel encoding processing on transmission data, divide the transmission data having undergone the channel encoding processing, for each symbol that is a unit of modulation processing, and transmit the transmission data to the at least one wireless device,
wherein the at least one wireless device is configured to convert a signal processed by the wireless signal processing unit into a wireless signal and transmit the wireless signal to the wireless terminal, and
wherein the at least one wireless device is configured to perform modulation processing for each symbol, on the transmission data transmitted from the wireless control device.

5. The wireless communication system according to claim 4,
wherein the at least one wireless device includes a plurality of antennas, and
wherein the wireless signal processing unit performs antenna weighting processing for each of the plurality of antennas.

6. A wireless communication system comprising:
a wireless control device: and
at least one wireless device which is connected to the wireless control device via a transmission line and configured to wirelessly communicate with a wireless terminal,
wherein the wireless control device includes:
- a wireless resource allocation unit configured to allocate a wireless resource used by the at least one wireless device in wirelessly communicating with the wireless terminal; and
- a wireless resource instruction unit configured to send an instruction for allowing use of the allocated wireless resource to the at least one wireless device, wherein the at least one wireless device includes:
- a wireless signal processing unit configured to execute processing to perform wireless communication using the allocated wireless resource, on data to be sent to the wireless terminal, based on the instruction from the wireless control device; and
- a wireless transmission unit configured to convert a signal processed by the wireless signal processing unit into a wireless signal and transmit the wireless signal to the wireless terminal, wherein the wireless control device is configured to perform channel encoding processing on transmission data, divide the transmission data having undergone the channel encoding processing, for each symbol that is a unit of modulation processing, and transmit the transmission data to the at least one wireless device, and
wherein the at least one wireless device is configured to perform modulation processing for each symbol, on the transmission data transmitted from the wireless control device.

7. The wireless communication system according to claim 6,
wherein the at least one wireless device includes a plurality of antennas, and
wherein the wireless signal processing unit is configured to perform antenna weighting processing for each of the plurality of antennas.

* * * * *